US011535280B2

(12) United States Patent
Barth et al.

(10) Patent No.: US 11,535,280 B2
(45) Date of Patent: Dec. 27, 2022

(54) METHOD AND DEVICE FOR DETERMINING AN ESTIMATE OF THE CAPABILITY OF A VEHICLE DRIVER TO TAKE OVER CONTROL OF A VEHICLE

(71) Applicant: Aptiv Technologies Limited, St. Michael (BB)

(72) Inventors: Alexander Barth, Wermelskirchen (DE); David Schiebener, Mettmann (DE)

(73) Assignee: Aptiv Technologies Limited, St. Michael (BB)

( * ) Notice: Subject to any disclaimer, the term of this patent is extended or adjusted under 35 U.S.C. 154(b) by 343 days.

(21) Appl. No.: 17/006,703

(22) Filed: Aug. 28, 2020

(65) Prior Publication Data

US 2021/0078609 A1 Mar. 18, 2021

(30) Foreign Application Priority Data

Sep. 17, 2019 (EP) ..................................... 19197824

(51) Int. Cl.
*B60W 60/00* (2020.01)
*B60W 40/02* (2006.01)
(Continued)

(52) U.S. Cl.
CPC ........ *B60W 60/0059* (2020.02); *B60W 40/02* (2013.01); *B60W 40/08* (2013.01);
(Continued)

(58) Field of Classification Search
CPC .. B60W 60/0059; B60W 40/02; B60W 40/08; B60W 50/14; B60W 60/0054;
(Continued)

(56) References Cited

U.S. PATENT DOCUMENTS 7,019,623 B2 3/2006 Klausner et al.
9,493,118 B1 11/2016 Laur et al.
(Continued)

FOREIGN PATENT DOCUMENTS

DE 102014225680 6/2016
DE 102018001970 9/2019
(Continued)

OTHER PUBLICATIONS

Amortila, et al., "Positioning Study of Driver's Hands in Certain Areas of the Steering Wheel", Jan. 2018, 6 pages.
(Continued)

*Primary Examiner* — Daryl C Pope
(74) *Attorney, Agent, or Firm* — Sawtooth Patent Group PLLC

(57) ABSTRACT

A computer-implemented method for determining an estimate of the capability of a vehicle driver to take over control of a vehicle, wherein the method comprises: determining at least one estimation parameter, the at least one estimation parameter representing an influencing factor for the capability of the vehicle driver to take over control of the vehicle; and determining an estimate on the basis of the at least one estimation parameter by means of a predefined estimation rule, the estimate representing the capability of the vehicle driver to take over control of the vehicle.

20 Claims, 8 Drawing Sheets

Figure 1:
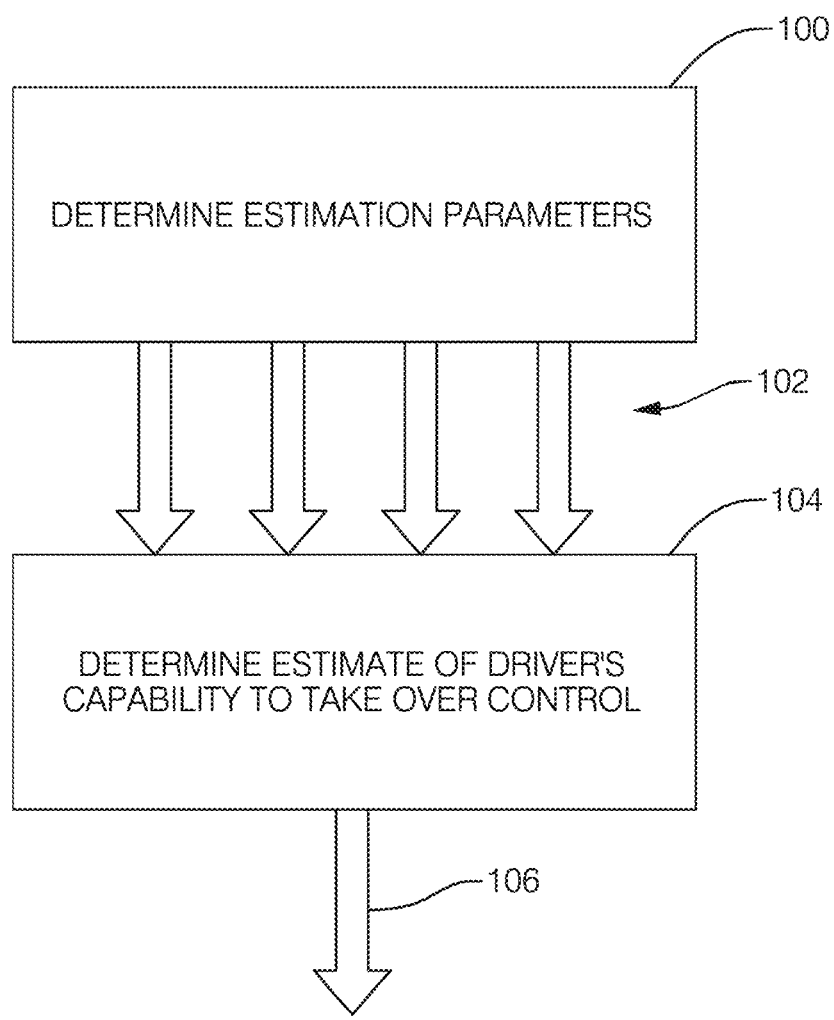

(51) Int. Cl.
  *B60W 40/08* (2012.01)
  *B60W 50/14* (2020.01)
  *G06V 20/59* (2022.01)
  *G06V 40/20* (2022.01)
  *G06V 40/10* (2022.01)
(52) U.S. Cl.
  CPC ........ *B60W 50/14* (2013.01); *B60W 60/0054* (2020.02); *B60W 60/0057* (2020.02); *G06V 20/597* (2022.01); *G06V 40/107* (2022.01); *G06V 40/28* (2022.01); *B60W 2540/227* (2020.02); *B60W 2540/229* (2020.02)
(58) Field of Classification Search
  CPC ....... B60W 60/0057; B60W 2540/227; B60W 60/007; B60W 2540/22; B60W 2540/223; B60W 2540/225; B60W 50/08; B60W 60/0053; B60W 2040/0818; B60W 2040/0872; B60W 30/182; B60W 40/00; B60W 50/00; B60W 2050/0001; G06V 20/597; G06V 40/107; G06V 40/28
  See application file for complete search history.

(56) References Cited

U.S. PATENT DOCUMENTS

| | | | |
|---|---|---|---|
| 9,637,120 | B2 | 5/2017 | Laur et al. |
| 9,727,056 | B2 | 8/2017 | Laur et al. |
| 10,007,264 | B2 | 6/2018 | Zhu et al. |
| 11,094,080 | B2 | 8/2021 | Schiebener et al. |
| 2006/0285723 | A1 | 12/2006 | Morellas et al. |
| 2011/0133919 | A1 | 6/2011 | Evarts et al. |
| 2012/0283894 | A1 | 11/2012 | Naboulsi |
| 2016/0207537 | A1 | 7/2016 | Urano et al. |
| 2016/0209841 | A1 | 7/2016 | Yamaoka et al. |
| 2016/0280235 | A1 | 9/2016 | Sugaiwa et al. |
| 2016/0357185 | A1* | 12/2016 | Laur .................... B60K 28/06 |
| 2016/0378114 | A1 | 12/2016 | Laur et al. |
| 2017/0057353 | A1* | 3/2017 | Griffin ................. A61B 5/4845 |
| 2017/0304732 | A1 | 10/2017 | Velic et al. |
| 2017/0327149 | A1 | 11/2017 | Schneider et al. |
| 2018/0046255 | A1 | 2/2018 | Rothera et al. |
| 2018/0365533 | A1 | 12/2018 | Sathyanarayana et al. |
| 2019/0092346 | A1 | 3/2019 | Odate et al. |
| 2019/0187701 | A1 | 6/2019 | Zheng et al. |
| 2019/0299996 | A1 | 10/2019 | Hagen et al. |
| 2020/0001882 | A1 | 1/2020 | Wulf |
| 2020/0039584 | A1 | 2/2020 | Igarashi et al. |
| 2020/0231109 | A1 | 7/2020 | Baltaxe et al. |
| 2020/0239007 | A1* | 7/2020 | Sobhany ............... B60W 50/14 |
| 2020/0320737 | A1 | 10/2020 | Schiebener et al. |

FOREIGN PATENT DOCUMENTS

| | | |
|---|---|---|
| EP | 3072770 A1 | 9/2016 |
| JP | 2017068424 | 4/2017 |
| WO | 2018113857 | 6/2018 |

OTHER PUBLICATIONS

Borghi, et al., "Hands on the wheel: A Dataset for Driver Hand Detection and Tracking", May 2018, 8 pages.
Cucchiara, et al., "Camera-car Video Analysis for Steering Wheel's Tracking", Apr. 2003, pp. 36-43.
Le, "Multiple Scale Faster-RCNN Approach to Driver's Cell-Phone Usage and Hands on Steering Wheel Detection", Jun. 2016, pp. 46-53.
Le, et al., "Robust Hand Detection and Classification in Vehicles and in the Wild", Jul. 2017, pp. 39-46.
Le, et al., "Robust Hand Detection in Vehicles", Dec. 2016, pp. 562-567.
Rangesh, et al., "Driver hand localization and grasp analysis: A vision-based real-time approach", Nov. 2016, 6 pages.
Tran, et al., "Driver assistance for "Keeping Hands on the Wheel and Eyes on the Road"", Dec. 2009, 6 pages.
Zhou, et al., "Hierarchical Context-Aware Hand Detection Algorithm for Naturalistic Driving", Nov. 2016, 6 pages.
"Corrected Notice of Allowability", U.S. Appl. No. 16/828,212, dated Jun. 1, 2021, 9 pages.
"Foreign Office Action", EP Application No. 19167436.5, dated Jul. 8, 2021, 7 pages.
"Notice of Allowance", U.S. Appl. No. 16/828,212, dated May 20, 2021, 12 pages.
"Extended European Search Report", EP Application No. 19167436.5, dated Oct. 10, 2019, 11 pages.
"Non-Final Office Action", U.S. Appl. No. 16/828,212, dated Feb. 22, 2021, 14 pages.
Cheng, et al., "Multi-spectral and multi-perspective video arrays for driver body tracking and activity analysis", Aug. 2006, 13 pages.
"Extended European Search Report", EP Application No. 19197824.6, dated Apr. 2, 2020, 8 pages.
"Extended European Search Report", EP Application No. 21179832.7, dated Oct. 11, 2021, 9 pages.

* cited by examiner

METHOD AND DEVICE FOR DETERMINING AN ESTIMATE OF THE CAPABILITY OF A VEHICLE DRIVER TO TAKE OVER CONTROL OF A VEHICLE

CROSS-REFERENCE TO RELATED APPLICATION

This application claims priority to European Patent Application Number 19197824.6, filed Sep. 17, 2019, the disclosure of which is hereby incorporated by reference in its entirety herein.

BACKGROUND

Automatic driving functions provided by, e.g., Advanced Driver Assistance Systems (ADAS) is an active field of development in the automotive sector. In particular, semi-autonomous or even full autonomous driving applications are subject to large-scale engineering efforts, wherein safety requirements are paramount because the driver hands over partial or full control to the vehicle, e.g., to a an ADAS. It has been found that the driver does not always take over control of the vehicle in a desired manner. Different circumstances may influence the driver's behavior in view of the capability to take over control, thus causing uncertainty; however, uncertainty is in conflict with predefined safety requirements in the context of ADAS.

SUMMARY

The present disclosure provides a computer-implemented method, a data processing device, a system, and a non-transitory computer readable medium according to the independent claims. Embodiments are given in the subclaims, the description and the drawings.

In one aspect, the present disclosure is directed at a computer-implemented method for determining an estimate of the capability of a vehicle driver to take over control of a vehicle, wherein the method is carried out by computer hardware components and comprises at least the following steps: determining at least one estimation parameter, the at least one estimation parameter representing an influencing factor for the capability of the vehicle driver to take over control of the vehicle; and determining an estimate on the basis of the at least one estimation parameter by means of a predefined estimation rule, the estimate representing the capability of the vehicle driver to take over control of the vehicle.

It has been found that the driver's capability to take over control can be estimated on the basis of one or more estimation parameters. Each of the estimation parameters carries information on the ability of the driver to take over control of a vehicle. A single estimation parameter may be sufficient in some cases. However, it is preferable to use more than one estimation parameter in order to increase the accuracy of the estimate. A plurality of estimation parameter can be fused according to the estimation rule so as to arrive at one single estimate about the driver's capability to take over control. The estimate can be determined for a given time instance so that the capability of the driver to take over control is also associated with this time instance. The estimate can consist of one or more values, which represent the capability of the driver.

The estimate can have a high accuracy although in some cases a low accuracy may be sufficient. A high or even very high accuracy can be achieved, e.g., by increasing the number of estimation parameters. The term "accuracy" refers to the error between the estimate and the true capability of the driver to take over control. The term "estimate" can be denoted as expected or predicted capability of the driver to take over control of the vehicle.

The predefined estimation rule generally represents the relationship between the at least one estimation parameter and the capability of a vehicle driver to take over control of the vehicle. In particular, the rule represents a statistical or deterministic model of the relationship between the at least one estimation parameter and the capability of a vehicle driver to take over control of the vehicle. The rule can be expressed as a mathematical function, which outputs the estimate in response to the one or more estimation parameters that are received as input variables. In one example, pre-calculated instances or groups of the function can be provided as a look-up table, thereby providing a very efficient estimation rule. In particular, the table can be configured to output a respective one of a plurality of predefined estimates in response to the at least one estimation parameter, wherein the value of the estimate is associated with the respective one of the predefined estimation parameters. The estimation rule can be stored in a storage device being connected to or being part of the computer hardware components that are used to carry out the method.

The estimation rule can be based on empirical findings, for example training data gathered from real test drivers. A plurality of samples can be collected in order to find out how fast a driver usually takes over control of the vehicle if he is required to do so. Statistics about the corresponding time periods can then be determined and put into relation to the estimation parameters for deriving a heuristic estimation rule. As one example, an average or maximum time period for taking over control of the vehicle can be determined on the basis of the multiple test driver responses.

Alternatively or additionally to empirical knowledge, theoretical knowledge can be used to derive the estimation rule. Examples for theoretical knowledge are knowledge about human cognitive speed, for example the time to understand a situation, and knowledge about the usual speed of movement of a portion of the driver's body. Physical limitations of the driver can be part of the estimation rule, but it is not always necessary to explicitly model limitations.

The estimate can contain various information, which represent the ability or capability of the driver to take over control. For example, the estimate can give information whether the driver will in principle be able to take over control and/or how fast, i.e. within what time period the driver will be able to take over control. The estimate can also contain one or more probability values about the driver's capability to take over control.

The expression "taking over control" can generally be interpreted such that the driver will bring himself into a position in which he is expected to be able to carry out one or more control actions so that the vehicle operates in a desired manner. For example, it can be assumed that the driver needs to sit at least roughly on the driving seat so that he is able to perform a steering action. In addition, it should be assumed that the driver needs at least one hand touching the steering element of the vehicle, e.g., a steering wheel, so that the driver can properly control the steering element in such a way that the vehicle drives on a desired course. It is understood that taking over control is not necessarily limited to this example and can comprise other aspects of a driver preparing himself to control the vehicle.

Further aspects of the disclosure will be understood when considering a general scenario in which the vehicle is operated by a driver-assist system or the like such that the driver does not need to be in control of the vehicle. For example, the vehicle automatically performs necessary steering actions and the hands of the driver do not need to cooperate with the steering wheel. As a result, the driver can use his hands for operating a mobile device, such as a smartphone, i.e. the hands cooperate with the mobile device instead of the steering wheel. In such a situation, it may happen that the driver-assist system detects a complex traffic situation in which no suitable steering action can be performed automatically with sufficient certainty. A warning signal may then be activated automatically so as to inform the driver that he is requested to take over control of the vehicle. The following process of the driver to get control, e.g., regain control of the vehicle can involve movement of certain parts of the body into appropriate driving positions. In particular, the driver will usually move one or both hands towards the steering wheel so as to arrive in a control position in which the hands cooperate with the steering wheel. As a result, the hands of the driver can grasp the steering wheel with traction so that the driver can perform desired steering actions. It is understood that a process of regaining or taking over control of the vehicle is influenced by various influencing factors, which are captured by the estimation parameters. As an example, the positions of the hands of the driver relative to the steering wheel influence the driver's capability to take over control of the vehicle. Without limitation, further examples are provided.

According to an embodiment, the estimate represents the capability of the vehicle driver to take over control of the vehicle if the driver is not in control of the vehicle. For example, the scale of the estimate can cover a range of situations in which the driver is not in full and/or partial control of the vehicle. In particular, one and/or both hands of the driver are not cooperating with a steering element of the vehicle and/or other portions of the body of the driver, in particular at least an upper portion of the body, are not in a predefined reference position if the driver is not in control of the vehicle. If the driver is expected to be in control of the vehicle due to one or more conditions being satisfied, the estimate can be set to a predefined constant value, for example 100 percent or 0 seconds, i.e. the driver can immediately perform a control action. The further away the driver is with respect to the one or more conditions the higher can be the difference between the corresponding estimate and the predefined constant value.

According to an embodiment, the estimate comprises a time period in which the driver is expected to take over control of the vehicle in response to a warning signal. In addition, or alternatively, the estimate comprises information on whether the driver is capable to take over control in response to a warning signal, in particular within a predefined time period. With this information a driver-assist system can decide if and/or when to hand over control of the vehicle to the driver. In this context, it is generally assumed that the system can select between different control states in dependence of the driver's capability, wherein in at least one of the control states the driver must have partial or full control of the vehicle.

Having further regard to the time period in which the driver is expected to take over control of the vehicle, which can be denoted as target period, it can be provided that a plurality of time periods related to the target period are determined as estimation parameters. For example, time periods can be determined for moving different portions of the driver's body and/or for mental processing of the driver. These time periods can be portions of the target period. The different time periods can be processed by means of the estimation rule in order to arrive at the desired estimate. As an example, a base time period can be determined on the basis of the physical distance between a body portion and the target or reference position of this body portion, wherein the base time period represents the minimum time in which the body portion can possibly be moved to the target position if maximum speed is assumed. Further time periods can be considered as offsets to the base time period. Such offsets can represent reductions in the driver's capability to take over control. If a reduction is detected, the corresponding offset can be added to the base time period. It is understood that the base time period and the offsets can all represent estimation parameters of the method disclosed herein.

According to an embodiment, the estimate represents the capability of the driver to take over partial control of the vehicle, wherein the driver is expected to have at least partial control of the vehicle if at least one hand of the driver cooperates with a manual steering element of the vehicle and/or if a body of the driver or at least one portion of the body matches a predefined driving position. Additionally or alternatively, the estimate represents the capability of the driver to take over full control of the vehicle, wherein the driver is expected to have full control of the vehicle if both hands of the driver cooperate with a manual steering element of the vehicle and/or if a body of the driver or at least one portion of the body matches a predefined driving position, i.e. reference position. In particular, it can be required that in addition to various upper portions of the body the head of the driver matches a reference position for partial and/or full control. For example, the viewing direction can be required to be directed towards a current traffic event. The body can generally be represented by one or more body key points, as will become more apparent in the following. It is further understood that while the hands can be considered as a portion of the body said matching of the at least one portion of the body can be in addition to the hands cooperating with the steering element.

Preferably, the driver is expected to have partial control of the vehicle if at least one hand of the driver cooperates with a manual steering element of the vehicle and if a body of the driver or at least one portion of the body matches a predefined driving position. For example, at least one hand needs to cooperate with the steering wheel, the upper portion of the driver's body needs to be in an upright position on the driver seat, and the head of the driver needs to be oriented towards a detected traffic event followed by a time period for mental processing. When the driver is in partial control of the vehicle he can be expected to perform a first type or range of control actions, for example small steering actions, which require manual movement of the steering element below a predefined threshold. The first type or range of control actions can be a subset of all possible steering actions. Partial control can be defined as a condition in which the driver is able to perform limited control actions.

Also merely preferably, the driver is expected to have full control of the vehicle if both hands of the driver cooperate with a manual steering element of the vehicle and if a body of the driver or at least one portion of the body matches a predefined driving position, e.g., an upright position on the driver seat. In addition, the head of the driver should be oriented towards a detected traffic event followed by a time period for mental processing. The driver can then be expected to be able to perform any appropriate control action, i.e. the driver has full control. In particular, the driver can be expected to perform a second type or range of control actions if he is in full control of the vehicle. Said first type or range of control actions can be a subset of the second type or range of control actions.

It is understood that the steering element can be a steering wheel or the like. Other possible steering elements are gear levers and other control or actuation elements in the vehicle.

According to an embodiment, the estimate comprises a minimum time period in which the driver is expected to take over partial control of the vehicle in response to a warning signal. The minimum time period is useful as an information on how fast the driver could possibly perform a limited control action in accordance with the definition of partial control. This can be for example a small but relevant turning action of the steering wheel in order to avoid a collision. An automated driver-assist system can still be activated but possibly requiring a correction from the driver. Alternatively, the automated driver-assist system can also be deactivated if partial control is considered to be sufficient in terms of safety.

According to another embodiment, the estimate comprises a maximum time period in which the driver is expected to take over full control of the vehicle in response to a warning signal. The maximum time period provides information on how fast the driver could possibly perform any required control action. This can be for example a full definition of the driving course through the driver by means of the steering element. An automated driver-assist system can be deactivated after the driver has taken full control of the vehicle.

According to an embodiment, the method further comprises the following step carried out by the computer hardware components: evaluating the at least one estimation parameter with respect to at least one target condition, wherein the driver is expected to be in control of the vehicle if the at least one target condition is satisfied or wherein taking over control of the vehicle is expected to be feasible and/or facilitated for the driver if the at least one target condition is satisfied. The at least one target condition can be defined with respect to partial and/or full control of the vehicle, for example as defined further above. It is also possible to use a plurality of target conditions, for example one target condition to check for partial control, and another target condition for full control.

The use of target conditions provides reference information, which renders the estimate more reliable and/or meaningful. The target conditions can be regarded as a means to standardize the estimate in the sense of clear criterions under which the capability of the driver is assessed. One or more target conditions can be applied to the estimate itself, either in addition or as an alternative to target conditions for the at least one estimation parameter.

According to an embodiment, the at least one estimation parameter represents position and/or distance information on at least one portion of the body of the driver, in particular wherein the at least one parameter includes position and/or distance information on one or more of the following: one and/or both hands of the driver, head of the driver, upper part of the body of the driver, hip and/or abdomen area of the driver, one and/or both eyes of the driver, one or more eyelids (e.g., the eyelid of one or both eyes) of the driver. The position information can comprise a location (e.g., the position of a predefined point given in coordinates of a coordinate system, for example a key point of the body) and/or an orientation (e.g., an angle, for example a turning angle of the driver's head). In other words, the estimation parameter can represent spatial information on the driver. This information is considered to have a high influence on the driver's capability to take over control of the vehicle. The estimate is therefore preferably based on position and/or distance information.

Position information can also represent classes of body configurations, wherein a body configuration comprises a predefined spatial relationship of various parts of the body. For example, the hand of the driver appears in different postures, which is due to different positions of the fingers relative to a central portion of the hand. Therefore, position information can comprise, e.g., that a hand is open or closed to a fist. Such types of position information can be determined on the basis of image data capturing the body or a portion thereof, wherein individual parts of the body are monitored relative to each other and/or relative to parts of the vehicle, in particular the steering element. This can comprise detecting characteristic key points of the body in the image data and/or fitting geometric models to parts of the body, for example to the hands. The same can be done for parts of the vehicle, in particular for the steering element. Classification of the body configuration can be carried out using, e.g., a neural network or the like. An example of body configurations defined relative to a part of the vehicle is the hand being below or above a reference level of the steering element.

According to an embodiment, the at least one estimation parameter is determined with respect to a reference object and/or a reference position, wherein the at least one estimation parameter is preferably determined as a time period in which the driver is expected to reach the reference object and/or reference position in response to a warning signal so as to satisfy at least one target condition, wherein the driver is expected to be in control of the vehicle if the at least one target condition is satisfied or wherein taking over control of the vehicle is expected to be feasible and/or facilitated for the driver if the at least one target condition is satisfied. The target condition can be defined, e.g., as described further above with respect to partial and full control of the vehicle. Another example is to use the time period required to reach the reference object and/or position. If the time period is below a threshold the driver can be expected to have partial or full control of the vehicle. Reaching the reference object or position can comprise movement of one or more portions of the driver's body towards the reference object or position. Preferably, the at least one estimation parameter is determined with respect to a reference object and/or a reference position if the estimation parameter comprises position and/or distance information.

In one embodiment, the position of a hand of a driver (one example of position information) is determined with respect to the steering element (one example of a reference object). If the position of the hand matches the position of the steering element, a target condition (hand cooperates with steering element) can be regarded as being fulfilled, i.e. satisfied. In this context, the distance between a hand of a driver and the steering element can be determined and provided as one estimation parameter. The distance or position can be converted or otherwise expressed as a time period in which the driver is expected to reach the reference object and/or reference position in response to a warning signal so as to satisfy the target condition. In an example, the time period can be the time required for the driver to move his hand from the position at the time of activation of the warning signal to the steering wheel until it cooperates with the steering wheel. The time period can be an estimation parameter for determining the estimate of the driver's capability to take over control of the vehicle.

In another example, the position of an upper part of the driver's body is determined and evaluated with respect to a desired position in which the upper part of the body matches with a normal upright seating position of the driver when he is sitting on the driver seat of the vehicle. The upper part of the body can comprise or be formed by the head and/or the neck portion of the driver, possibly also the shoulder portion and further portions of the body, which may be represented by one or more key points of the body. The distance or mismatch between the current position of the upper part of the body at the time of activation of the warning signal and the desired position (i.e. reference position) can be converted or otherwise expressed as a time period required by the driver to move his upper body portion to the reference position. This time period can be an estimation parameter for determining the estimate of the driver's capability to take over control of the vehicle. Preferably, this time period is an estimation parameter in addition to the time period for moving one and/or both hands to the steering wheel.

A conversion of a position and/or distance to the corresponding time period can be carried out by using a predefined model. The model can comprise a portion representing the mental processing period required to sense the warning signal and to initiate appropriate movement of the body. The model can also comprise a physical motion period required to move the respective portion of the body to the reference object or position. The predefined model can be part of the predefined estimation rule or the predefined estimation rule can be formed by the predefined model.

According to an embodiment the method further comprises the following steps carried out by the computer hardware components: determining, for a plurality of position classes, a similarity between a current position of the driver and each of the position classes, wherein each of the position classes represents a position of the driver in which taking over control of the vehicle is expected to be feasible and/or facilitated for the driver; selecting one of the plurality of position classes having maximum similarity to the current position, wherein the at least one estimation parameter represents at least one distance between the selected one of the plurality of position classes and the current position of the driver.

The position classes can be generated beforehand by applying a clustering method to image training data, wherein the training data comprises images with various driver positions in which taking over control is feasible and/or facilitated. The resulting classes represent groups of reference driver positions, which are different between the groups (and more similar within the groups) but all acceptable for taking over control. This approach ensures a higher accuracy compared to the case in which only one single reference driver position is considered. The similarity between the current position and the respective class can be determined by first determining 2D- and/or 3D-body key points of the driver (e.g., head, shoulders, elbows, hands, hip, knees, feet) on the basis of image data followed by determining the distance between the body key points to the cluster centers of the respective class (i.e. distance to the reference locations of the body key points for the respective class). Afterwards, the time periods required for the driver to move the respective body key points to the respective reference positions are determined. The overall time period required to move the various body parts to their reference positions can then be determined on the basis of the time periods of the individual key points, for example by taking the maximum, average or a percentile of the time periods. A weighted average may also be used. In this way, it can be for example determined how fast the driver will move his upper body portion to an appropriate driving position. It is understood that the overall time period as well as the per-key point time periods depend on the distances between the key points and their reference counter parts.

The distances between the body key points and the cluster centers (i.e. the reference positions) are preferably determined as 3D distances, i.e. the distances are given with respect to the three spatial dimensions. This can be done if the body key points are determined or given as 3D-body key points, for example on the basis of 3D-image data of the driver. If, however, 3D-image data is not available, and 2D-image data is used instead, it can be provided that the body key points are determined as 2D-body key points, wherein the distances between the body key points and the cluster centers are still determined as 3D distances. This can be done by determining the distances as 2D distances followed by determining estimates of the 3D distances on the basis of the 2D distances.

The per-key-point time periods can be determined by using predefined functions that are associated with the respective key points. The functions can be dependent on an acceleration factor for the underlying body portion, which represents the average acceleration of movement of the body portion. Additionally, the function can be dependent on personal factors of the driver such as age, tiredness, physical fitness and the like, which can also be detected on the basis of image data, for example by trained neural networks. If for some reason a body key point cannot be detected, a predefined constant can be used as the time period for the respective key point. The constant may also be variable in dependence of the current personal factors of the driver.

An alternative approach is to train a classifier on the basis of manually labelled training data comprising images with different drivers being in acceptable and inacceptable driving positions. The trained classifier can then be used to classify a current driving position in order to decide whether the driver is able to take over control of the vehicle or not. Another approach is to train a prediction model on the basis of video data comprising different examples of drivers taking over control after a warning signal. The time period required to take over control can then be predicted by using the trained model, which takes current video data of the driver as input.

According to an embodiment, the at least one estimation parameter represents interaction and/or object information on at least one portion of the body of the driver, in particular wherein the at least one estimation parameter includes one or more of the following: information on whether one and/or both hands of the driver cooperate with a manual steering element of the vehicle, information on whether one or both hands of the driver cooperate with an object other than the steering element, information on whether an object is placed on the lap of the driver, information on whether an object is present on an ear of the driver. The object information can comprise a class or type of an object that cooperates with the driver. Interaction information can improve the accuracy of the estimate. In one example, if both hands already cooperate with the steering element it may be easier for the driver to bring his body into the appropriate driving position. The driver's capability to take over full control of the vehicle can thus be enhanced.

In another example, one hand of the driver cooperates with an object, for example a smartphone. It can then be expected that the time until the hand can cooperate with the steering element is significantly longer because the driver will first have to put down the smartphone before he will move his hand to the steering element. In some cases, the time will be even longer, for example if the object in his hand is a piece of food, e.g., a burger. It can be expected that the driver will not drop the burger anywhere but only in a suitable place. Therefore, the type or class of object in the driver's hand may cause additional delay. Similarly, other objects on the driver's body may be considered, for example a notebook on the driver's lap or headphones on the ears. It is understood that the interaction and/or object information can comprise knowledge on an object being present at a predefined part of the body (e.g., the driver is holding an object in his hand) and/or knowledge on the type of object (e.g., mobile device, food, headset). Object detection algorithms are known from the art and can be used to extract interaction information. Various sensor technologies may be used to detect objects and their spatial relationship to the driver, in particular one or more cameras for providing image data of the driver and/or the vicinity of the driver.

As another example of object information, an obstacle object can be positioned between the reference object or position and a respective body portion, for example the hand of the driver. A direct path for moving the hand to the reference object can thus be blocked by the obstacle and cause delay of the driver's capability to take over control of the vehicle.

It is generally assumed that the driver has exactly two hands. As certain individuals can deviate from this assumption this may be detected and appropriate modifications of the method may be foreseen.

In general, a state in which the at least one hand cooperates with the steering element can comprise that the at least one hand touches the steering element and/or is in close proximity to the steering element, wherein "close proximity" means that the distance between the hand and the steering element is assumed to be below a threshold. Said state can also comprise that the hand is assumed to operate the steering element or intents to operate the steering element.

According to an embodiment, the at least one estimation parameter represents distraction information on the driver, in particular wherein the at least one estimation parameter includes information on one or more of the following: activity of the driver, for example operation of a mobile or stationary device, additional passengers in the vehicle for example number and/or position of additional passengers within the vehicle, operation of electronic media inside the vehicle, telephone conversation inside the vehicle, noise, in particular conversation noise inside the vehicle. It has been found that distraction information is useful to increase the accuracy of the estimate. For example, if the radio of the vehicle is switched on and the driver is making a telephone call in parallel it has been found that the time required to take over control of the vehicle after a warning signal is usually longer than otherwise. Distraction information on the driver can be based on position information on the driver's body. For example, if the eyes are directed to an area inside the vehicle, perhaps towards a mobile device, this indicates a higher reaction time because the mind of the driver is assumed to be relatively occupied.

According to an embodiment, the at least one estimation parameter represents information on an operational state and/or environment of the vehicle, in particular wherein the at least one estimation parameter includes information on one or more of the following: vehicle speed, a property of air inside and/or outside the vehicle for example temperature and/or humidity, opening state of one or more windows of the vehicle, operation of one or more wipers of the vehicle, configuration of a driver seat of the vehicle, number and/or position of objects around the vehicle, number and/or size of traffic signs detected by the vehicle, traffic environment of the vehicle, street condition. It has been found that the operational state and/or the current environment of the vehicle also influence the driver's capability to take over control of the vehicle. For example if there is a high temperature in the passenger cabin the driver may be exhausted and thus less responsive to the warning signal. On the other hand, if the vehicle speed is very high, the driver may be more careful and prepared to take over control almost instantly at any time. Such circumstances may thus be captured by one or more estimation parameters. Depending on the type of desired information, the estimation may be directly captured from a control device of the car, for example the vehicle speed, the operational status of the wipers or a sensor of an automatic air-conditioning system of the vehicle. As another example, the seat configuration can be captured from the car if the seat is configured electronically. Otherwise, image based detection means can be used.

According to an embodiment, the at least one estimation parameter represents fitness and/or personal information on the driver, in particular wherein the at least one parameter includes information on one or more of the following: drowsiness of the driver, mood of the driver, properties of the body of the driver for example age, gender, size, predefined reaction-capability values of the driver. It is understood that the information can be provided from appropriate sources. For example, the personal information of the driver, e.g., age, can be provided via a personal key of the driver or via a smartphone of the driver, which is connected to a vehicle system. Predefined reaction-capability values may directly be derived from the personal information. Other information, for example the drowsiness of the driver can be extracted from one or more images of the driver, wherein the drowsiness and/or gestures can be estimated, e.g., using a machine learning-algorithm. The drowsiness can also be determined by evaluating the frequency of control actions of the driver with respect to the traffic situation. Frequent corrections of the steering wheel position while driving on a high way can be an indicator of drowsiness.

In another embodiment, the at least one estimation parameter represents information on past values of the at least one estimation parameter. For example, if detected manual operation of a navigation system of the vehicle is an estimation parameter, the time when the driver last operated the navigation system may also be an estimation parameter. The driver often needs some time after operating the navigation system or other media in order to regain full concentration for taking over control of the vehicle. The capability of the driver to take over control can thus be influenced by the time context, which can be captured by one or more estimation parameters over time.

It is understood that a given estimation parameter can for example represent both an operational status of the vehicle and distraction information for the driver. This means that a given estimation parameter can represent various information categories, which are relevant for the driver's capability to take over control of the vehicle. It is also possible that the estimate is determined on the basis of a plurality of estimation parameters, wherein each of the estimation parameters represents one type of information as disclosed herein in view of the at least one estimation parameters. In particular, a first estimation parameter can represent position and/or distance information, a second estimation parameter can represent interaction and/or object information, a third estimation parameter can represent distraction information, a fourth estimation parameter can represent information on an operational state and/or environment of the vehicle, a fifth estimation parameter can represent fitness and/or personal information, or a sixth estimation parameter can represent represents information on past values of the at least one estimation parameter. A subset with one or more of these estimation parameters is also feasible.

According to an embodiment the estimation rule can be dependent on the driver. In particular, the estimation rule can be configured in dependence of personal information of the driver, which can be provided as estimation parameters. The estimation rule can be learned for a specific user, wherein for example a predefined estimation rule can be parameterized in dependence of the learned data. In this way, user-specific data can be explicitly considered for the method.

It has been found that at least some of the estimation parameters described above can be determined by means of one or more sensors. In particular, sensors for capturing image data are of interest because image data can encode many influence factors for the driver's capability in one piece of data. In this regard, vehicles can now be equipped with cameras for driver monitoring or gesture control, which may become standard in the future. Such cameras can be utilized for the task of determining one or more estimation parameters, for example hands-on-steering-wheel detection or in general hands-on-steering-element detection. This is to say that the camera can be used to detect a hand of the driver within the vehicle. It can also be used to determine whether a hand of the vehicle driver cooperates with a steering element (e.g., a steering wheel or the like). When a hand cooperates with the element, the hand can at least partially be in physical contact with a portion of the steering element. It is also possible that the hand is located in close proximity to a portion of the steering element. The portion of the steering element can be predetermined, for example the outer ring of a steering wheel and/or a strut inside the ring.

According to an embodiment, determining the at least one estimation parameter comprises the following steps carried out by the computer-hardware components: taking at least one image by means of at least one image sensor mounted on the vehicle, wherein the at least one image captures a portion of the interior of the vehicle, preferably at least a steering element of the vehicle and/or an area in which at least a portion of the driver is expected to be located while the driver is in control of the vehicle; and determining, on the basis of the at least one image, the at least one estimation parameter. The one or more estimation parameters can thus be extracted from image data, which captures the interior of the vehicle, fully or partially. The image can capture parts or areas of the vehicle that are useful for determining whether one or more target conditions are fulfilled. For example, it may be determined from the image whether at least one hand of the driver cooperates with the steering element. It may also be determined whether the driver is in an upright position, i.e. the body of the driver matches at least partially with a predefined driving position. It can also be determined whether the driver is located outside a predefined area. If the driver is outside the area it may be concluded that the driver cannot take over control of the vehicle in a short amount of time, i.e. within a time period below a threshold.

In another embodiment, an automated control function of the vehicle is deactivated if the estimate satisfies a predefined safety condition and wherein otherwise preferably an emergency control function of the vehicle is activated. In more general terms, if the estimate satisfies, i.e. fulfils a safety condition, a first control action is taken, wherein otherwise a second control action is taken.

Therefore, the estimate can be used to control the vehicle, in particular for activating or deactivating control systems of the vehicle. The information of the estimate can be provided via a communication interface to a processing unit of the vehicle, where the information can be processed in order to enable safe automatic vehicle applications (e.g., Advanced Driver Assistance Systems), in particular an autonomous driving application. For example, it can be provided that the automatic vehicle application can only be activated if the driver's capability to take over control according to the estimate satisfies a safety condition.

The estimate can be provided to one or more processing units inside the vehicle via a communication interface, for example CAN-Bus or Ethernet. The estimate can also be provided to processing units outside the vehicle via a communication interface, for example to a central server that is connected via a mobile connection to the vehicle. The processing unit receiving the estimate can perform an appropriate action, for example activation or deactivation of automatic functions, as also indicated above.

As indicated above the method can be based on processing one or more images. An image can be formed by a group of pixels, each pixel having at least one pixel value. The pixels can correspond to photosensitive elements, but they are not restricted thereto.

In an embodiment, the at least one image comprises three-dimensional (3D) image data. The at least one sensor can comprise for example a structured light camera, a time-of-flight camera, an ultrasonic sensor, a radar sensor and/or a Lidar sensor. Other sensors for acquiring three-dimensional image data can also be used, in particular multiple sensors, e.g., a stereoscopic sensor pair.

In an example, two sensors are used, wherein one of the sensors provides image data that captures the driver or a portion thereof when the driver is sitting on the driving seat and wherein the other one of the sensors provides image data that captures the steering element of the vehicle, possibly including an area around the steering element. The image data does not necessarily have to be 3D-image data. However, relying on 3D-image data can improve the accuracy of the method.

In one particular example, one vision sensor is provided that is able to capture the driver in the driver seat at least up to the shoulders, the steering wheel, and the surrounding of the steering wheel. The sensor can be, for example, mounted in the roof or rear view mirror area. In another example, the sensor is mounted in the center stack, instrument cluster, steering column, A-pillars, or on top of the dashboard. Possible sensors include 2D cameras (RGB, RGB-IR, NIR) or 3D sensors (Time-of-Flight camera, structured light camera, stereo camera) that also provides depth information along with the 2D-image data.

In one further example, a wide angle camera is mounted at the center roof position of the vehicle (above the first row) such that the camera is directed at the full driver body. In addition, a narrow-angle driver-facing camera is directed on the driver head region.

3D-image data comprising, e.g., amplitude (i.e. light intensity) and/or depth (i.e. distance) information allows for a great improvement of the reliability with respect to obtaining the desired information, in particular one or more estimation parameters. An estimation parameter can be for example a likelihood, e.g., a probability value indicating the probability that the at least one hand cooperates with the steering element. The information can be provided as a variable having a defined scale, e.g., between zero and one, which simplifies further processing of the variable. The variable can also be discrete or even binary, i.e. the variable can only take on two different values, e.g., zero and one. In another example, a distance between the at least one hand and the steering element can be determined with high accuracy from the 3D-image data. However, also for 2D-image data, the distance and other estimation parameters such as position of body parts can be determined.

It is understood from the foregoing that the one or more estimation parameters can be determined by a visual approach, i.e. by using image data. One or more sensors may be required for this purpose, which are, however, available on the market at low cost. As another aspect, many different estimation parameters can be determined from, e.g., one image of the passenger cabin by using known or novel image-processing algorithms, wherein portions of interest can be identified or detected in a given image. The estimation parameters can be partially determined as classification data from an image. For example, an estimation parameter can be formed by classification data about the spatial relationship between the hands and the steering element (e.g., relative position or distance), wherein a plurality of position categories can be defined for the spatial relationship. As another example, a hand-pose classification can be provided as an estimation parameter because the hand pose can represent relevant information about the driver's capability to take over control of the vehicle. Moreover, statistical information can be provided through one or more estimation parameters, as will become more apparent in the following.

In contrast to sensors mounted directly on a steering element and which may require a physical contact to the steering wheel for their activation, a vision-based approach can be configured such that a meaningful estimation parameter about the spatial position of the hands can be generated when one or more hands are merely in close proximity to the steering element, which allows for grabbing the steering element in a very short amount of time, e.g., less than half a second. Therefore, a state in which a hand is in close proximity to the steering element and/or ready to grab the steering element can also be a type of cooperation with the steering element. However, it may alternatively be provided that only a grasp of the steering element is detected as a cooperation with the steering element. Thus, sensors may be provided for detecting physical contact between the hand and the steering element. For this purpose capacitive or other touch sensors can be installed in the steering element. Torque sensors may also be used. The sensor outputs can be used to provide additional estimation parameters of the method.

In the following, exemplary embodiments are described for determining an information on whether one or both hands of the driver cooperate with the steering element of the vehicle. This information can be used as an exemplary estimation parameter for the method described herein. Other estimation parameters may be determined in the same or similar fashion using a vision-based approach. In particular, the method can be adopted for portions of the body other than the hands and for portions of the vehicle other than the steering element.

According to an embodiment, the method further comprises the following steps carried out by the computer-hardware components: detecting the steering element within the image; detecting the at least one hand within the image (when the at least one hand is contained in the image); determining a distance between the detected steering element and the detected at least one hand; and determining a first likelihood value on the basis of the distance, the first likelihood value indicating whether the at least one hand cooperates with the steering element, wherein the estimation parameter is determined in dependence of or formed by the first likelihood value. The likelihood value can represent a probability of whether the at least one hand cooperates with the steering element. The detection of the specific portions within the image can be performed by means of one or more detection algorithms known from the field of image processing. The detection within the image represents a localization of the respective objects, i.e. the at least one hand and the steering element. A specific type of detection is described in the following. If only the distance between the detected steering element and the detected at least one hand is of interest as an estimation parameter, the step of determining the first likelihood value may be omitted.

In another embodiment the detected steering element is represented by a model of the steering element, the model having a position and/or an orientation matching with the position and/or orientation of the steering element in the vehicle, wherein the position and/or orientation of the model are determined by means of a matching algorithm. The matching algorithm can be configured as an evolutionary algorithm, in particular a particle filter, which can be parameterized with simulated annealing. Alternatively or in addition, a grid-search algorithm can be employed, i.e. the position and/or orientation of the model are determined by evaluating a cost function at predetermined samples in a predetermined search space. The use of regression algorithms is another alternative.

The matching algorithm can comprise the following carried out by the computer-hardware components: generating a plurality of sample points for the model, each of the sample points having a spatial position; determining, for at least some of the sample points, a plurality of sample pixels of the at least one image, each of the sample pixels having a respective pixel value of the at least one image; computing a rating function on the basis of the sample pixels, i.e. their pixel values; determining the matched model on the basis of the rating function. It is understood that the at least one image comprises a plurality of pixels, each of the pixels having a respective pixel value. The sample pixels are a subset of the totality of pixels that form the at least one image.

The model can comprise a geometrical model of the steering element. For example, the model or the outer shape of the model can be represented by a mathematical function, which is a very compact representation and therefore associated with a number of advantages. The model can also be represented by a limited number of points in order to reduce the complexity of the method.

When the steering element is formed by a steering wheel said model of the steering element can be for example a torus, in particular an elliptical torus. To estimate its 3D position and orientation (pose), possible locations can be sampled by regular-grid search and/or a particle-filter like approach. For each pose sample, the rating function can be calculated based on a specific portion of pixel values of the at least one image, these pixels can be selected on the basis of the generated sample points, as indicated further above. The rating function can generally represent the match between the model at the respective sample location and the image.

Having further regard to said generated sample points for identifying the sample pixel values, a first group of the sample points can be located on the geometrical model, and a second group of the sample points can be located outside the geometrical model, wherein difference pixel values can be computed between sample points of the first and second group. This can be done by subtracting pixel values of the sample pixels being associated with the sample points. In particular, each difference pixel value can be formed by subtracting a pixel value from the first group from a pixel value of the second group, wherein both pixel values are associated with a pair of sample pixels positioned on a line that extends in a radial direction or transversely with respect to the model. The rating function can be computed on the basis of the difference pixel values, which allows detecting the steering element with high accuracy.

In one example, the values of the first group can be depth (i.e. distance) values of sample points located centrally on the model. In addition or alternatively, depth values of image points located on the outer edge of the model can be used. The values of the second group can be the depth values of the sample points located outside the model. The values of some points of the first group, for example the points located on the edges, can be gradients of the depth values, wherein these gradients result from processing the depth values by an edge detection filter, e.g., a Sobel edge filter. Exemplary algorithmic details are described further below.

According to an embodiment, the detected at least one hand is represented by a plurality of positions of the at least one hand, wherein the positions are associated with characteristic portions of the at least one hand. The positions can be three-dimensional positions, which are determined on the basis of the image data. In one example characteristic hand points can be computed, e.g., on the basis of image statistics or by using models trained by way of machine learning. The positions can be formed by 3D points representing the center of the hand and one or more finger tips. The use of a limited number of positions reduces the amount of data for the detected hand and also allows for efficient extraction of information on the grabbing pose of the hand with respect to the steering element. The information can be provided as one or more estimation parameters.

According to another embodiment, detection of the at least one hand comprises the following steps carried out by the computer-hardware components: determining at least one hand region within the image by comparing the image with a reference image, wherein the hand region represents a portion of the image, which is expected to contain the at least one hand; determining the at least one hand on the basis of the hand region by means of a classifier; determining the plurality of positions for the at least one hand.

In one example, the hand is detected by a foreground-background segmentation step. The static background of the vehicle and the non-moving part of the driver can be represented by a background model (i.e. a reference image), which can be created at runtime. It can therefore consist of the static scene. At runtime, the image is compared to the background model and significant changes (e.g., signal above noise level) are identified. The foreground map can then be analyzed to create potential hand region candidates. A hand classification module can then be used to reject hand regions that do not contain a hand, e.g., by using a machine-learning based image classifier (for example a convolutional neural network or a cascaded classifier).

In another example, a convolutional neural network can be trained to detect hand regions (e.g., as bounding boxes) on the basis of the at least one input image, wherein the image may comprise amplitude and/or depth information. Once a hand region has been detected by the neural network, 3D coordinates for characteristic hand points can be computed as indicated further above.

In yet another example, a convolutional neural network can be trained to detect the characteristic hand points directly from the input image. In one variant the neural network can be trained to provide a heat map output around the hand. From the heat map, which can generally comprise information on the spatial temperature probability distribution, characteristic 2D points can be derived, e.g., by fitting a Gaussian model or by weighted averaging of the heat map entries. This approach can include an initial clustering step as well as an outlier removal step. The depth coordinate can be derived from the 2D points and the underlying depth data if the image comprises such data.

If depth data is not directly acquired by the sensor, the depth data can be approximated on the basis of an assumed size of the hand.

In another example a deep neural network can be trained to perform a semantic segmentation of the input image, where preferably each pixel of the image will be assigned to a respective one of a plurality of classes having the maximum likelihood value, wherein at least one of the classes corresponds to a hand class. Segments of hand pixels can then be processed as described further above in connection with the foreground-background segmentation approach.

The step of determining the difference between the detected steering element and the detected at least one hand can comprise the following steps: determining a minimum distance between the detected at least one hand; and determining the first likelihood value in dependence of the minimum distance and a threshold.

The distance can be determined by a distance measure, for example Euclidean distance. Uncertainties of the steering wheel location and the hand positions can also be taken into account by using suitable distance measures (e.g., by using the Mahalanobis distance instead of Euclidean distance).

The minimum distance can be determined by first calculating the minimum distances between the points of the detected hand and the steering element and then selecting the minimum of these distances.

The minimum distance can be mapped to the likelihood value using a likelihood mapping function. The resulting values can be, for example, in the range of 0 and 1. With a minimum distance d between one or both hands and the steering element the likelihood value p can be calculated by the following formula $p=\max(0,1-d/(2t))$, wherein $\max(\ )$ selects the maximum of the two arguments and t is a threshold for the maximum distance at which the hand is considered to cooperate with the steering element.

In a variant the minimum distance can be mapped to the likelihood value using a threshold function, e.g., the hand is considered to cooperate with the steering element if the minimum distance to the steering wheel is below a threshold.

According to an embodiment, the method comprises the following steps carried out by the computer-hardware components: detecting the steering element within the image; determining a steering-element portion of the image by cropping the image to a region of the detected steering element; determining a second likelihood value on the basis of the steering portion by means of a neural network, the second likelihood value indicating whether the at least one hand cooperates with the steering element, wherein the information is determined in dependence of the second likelihood value.

Said neural network for determining the second likelihood value can be a deep neural network trained on images being cropped to a steering element. The region of the detected steering element can capture the complete steering element as well as some configurable margin. The advantage of this is that the steering element is always at a similar position within the cropped image, which reduces the complexity of the data input to the neural network. In addition, the depth data of the cropped image can be normalized based on the 3D location of the steering element.

Instead of detecting the steering element as such it can be provided that a fixed image portion is cropped that is large enough to contain the steering element in all possible positions and/or orientations as well as a configurable margin of the steering element.

The method can further comprise the following steps carried out by the computer-hardware components: detecting the at least one hand within the image when the at least one hand is (at least partially) contained within the image; determining at least one hand portion of the image by cropping the image to a region of the detected at least one hand; determining a third likelihood value on the basis of the at least one hand portion by means of a neural network, the third likelihood value indicating whether the at least one hand cooperates with the steering element, wherein the information on whether the at least one hand cooperates with the steering element is determined in dependence of the third likelihood value.

According to another embodiment a fourth likelihood value can be determined on the basis of the complete image by means of a neural network, the fourth likelihood value indicating whether the at least one hand cooperates with the steering element, wherein the information is determined in dependence of the fourth likelihood value. For example, image regions can be cropped around every detected hand in the proximity of the detected steering element location with a configurable margin. The image regions can have a rectangular shape.

The cropped image regions can be classified by a deep neural network, wherein the network can be a convolutional neural network. Its output can be a single neuron that outputs a value between 0 and 1 corresponding to a likelihood that a hand cooperates with the steering element. In another variant multiple output neurons can be provided that output a likelihood for individual hands (e.g., left hand on wheel, right hand on wheel), or likelihoods for hands touching a certain region of the steering wheel.

It is possible to use an ensemble of neural networks which implement one or more of the above variants, wherein the individual networks are preferably trained differently (e.g., on different data sets or with different parameters).

Although some of the likelihood values described further above, in particular said first, second, third, and fourth likelihood values, are presented with an index (first, second, etc.) this is merely for identification purposes and no further meaning shall be inferred from the indices, in particular no ordering of the method steps. In addition, it is emphasized that the method may also be carried out with only one said first, second, third, and fourth likelihood values. Combinations of two, three and four of the likelihood values are also possible. For some of the likelihood values, two versions can be determined, one for each of the hands.

The step of determining the information on whether the at least one hand cooperates with the steering element can comprise the following: determining a plurality of likelihood values, each of the likelihood values indicating whether the at least one hand cooperates with the steering element; and fusing of the likelihood values by means of a predetermined fusion rule. The likelihood values can comprise at least one of said first, second, third and fourth likelihood values. Preferably, at least two likelihood values are fused.

The fusion rule can generally be configured to increase the reliability of the fused output value in a statistical sense. This is to say that the likelihood values can be fused, e.g., in a data fusion module, to increase the overall robustness of the method. The fusion rule can be based on a "mixture of experts" method (see e.g., Yuksel, Wilson and Gader (2012): Twenty years of mixture of experts for an overview). In one example a probabilistic multiplication can be used as a predetermined fusion rule. This is, with pi being the likelihood values, i being the index, the fused overall likelihood value for determining the desired information is $p=\Pi pi/(\Pi pi+\Pi(1-pi))$, wherein $\Pi$ denotes the multiplication over all i. This rule has been shown to perform particularly well on the present task. The information on whether the at least one hand cooperates with the steering element can be formed by the fused likelihood value.

The fusion rule can alternatively be configured to calculate a weighted average of the individual likelihood values. Another possibility is to combine the likelihood values using an OR logic or an AND logic. Yet another approach is to use a classifier (e.g., neural network or SVM) for obtaining the fused output based on the individual likelihood values.

It may be provided that more than one hand is detected and a likelihood value can be determined for each of the hands. For the purpose of fusion, it may then be provided that the highest one of the two likelihood values is used for the fusion step. This may be sufficient if for a given vehicle control application it is only required to monitor whether one single hand cooperates with the steering element.

The methods disclosed herein can be used alone, i.e. without sharing further information from other sensors. However, the information can also be fused with signals acquired by means of classical touch/pressure/torque sensor-based systems in order to increase the overall reliability of the information even further.

In one embodiment a first portion of the likelihood values is determined on the basis of the complete image and/or portions thereof by means of at least one neural network, and wherein a second portion of the likelihood values is determined on the basis of at least one difference value representing a distance between the steering element and the at least one hand.

In view of the foregoing it is understood that various approaches for determining estimation parameters can be adopted. The information on whether at one or both hands of the driver cooperate with the steering element can be used as one estimation parameter. As another example, the distance between the steering element and the at least one hand can be used as one estimation parameter. The distance can be determined as explained in the context of the different approaches further above, wherein determination and fusion of the plurality of likelihood values can be omitted if desired. On the basis of the distance the time required for the driver to move his hand to the steering element can be calculated, thus providing the estimate, a portion of the estimate or a further estimation parameter. The distance can be defined and determined as the minimum distance, as explained further above.

While extraction of the position and/or distance information has been described in view of the relationship between the hands and the steering element, it is understood that the same approaches can be adopted for determining other estimation parameters. In one example, the position and/or distance information can be determined with these approaches in view of the relationship between the driver's body and the driver seat. In particular, the driver seat can be represented by a model, wherein it is determined whether the driver's body cooperates with the driver seat.

In another aspect, a data-processing unit for determining an estimate of the capability of a vehicle driver to take over control of a vehicle is provided, wherein the processing unit is configured to carry out the method of one of the preceding embodiments. The processing unit can be configured as a data-processing unit and may comprise at least one memory unit and at least one non-transitory data storage. The non-transitory data storage and/or the memory unit may comprise a computer program for instructing the computer to perform several or all steps or aspects of the computer-implemented method described herein.

The data-processing unit can be located in the vehicle. The method can then be carried out independently from a mobile connection to a central server. However, a portion or all steps of the method can be carried out on a data-processing unit outside the vehicle, which can be said central server. Data from multiple drivers can be analyzed on the central server, wherein the estimation rule can be modified in dependence of the analysis. The accuracy of the method can then be further enhanced.

In yet another aspect, a system is provided with a processing unit for determining the estimate of the capability of the driver to take over control of the vehicle. The system comprises at least one sensor configured to take at least one image of the interior of the vehicle, wherein the image preferably captures at least a steering element of a vehicle and/or an area in which at least a portion of the driver is expected to be located while the driver is in control of the vehicle. The at least one sensor can be configured to provide three-dimensional image data for the at least one image. Furthermore, the area in which at least a portion of the driver is expected to be located while the driver is in control of the vehicle can be defined as an area of the driver seat of the vehicle. The system can include a communication interface for sensing and/or receiving data with respect to carrying out the method.

In a particular example, the at least one sensor comprises a structured light camera, a time-of-flight camera, an ultrasonic sensor, a radar sensor and/or a Lidar sensor.

According to yet another aspect a non-transitory computer readable medium is provided. The medium comprises instructions, which when executed by said processing unit, cause the processing unit to carry out the method according to one of the embodiments disclosed herein. The medium can be part of the vehicle and connected to the processing unit. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

It is understood that features described in connection with the method can be realized in the device as well as the system and vice versa.

DRAWINGS

Figure 2:
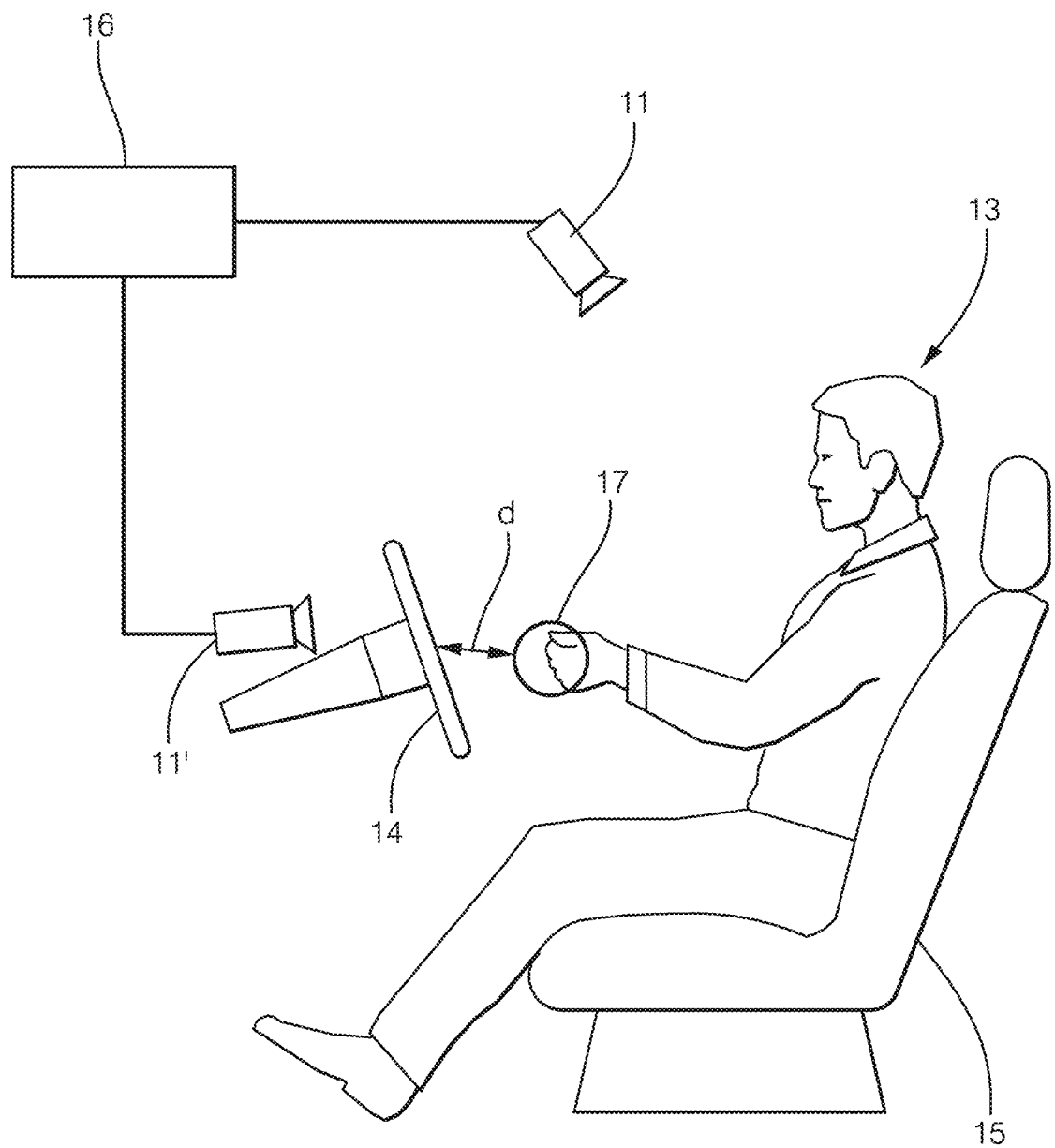
Figure 3A:
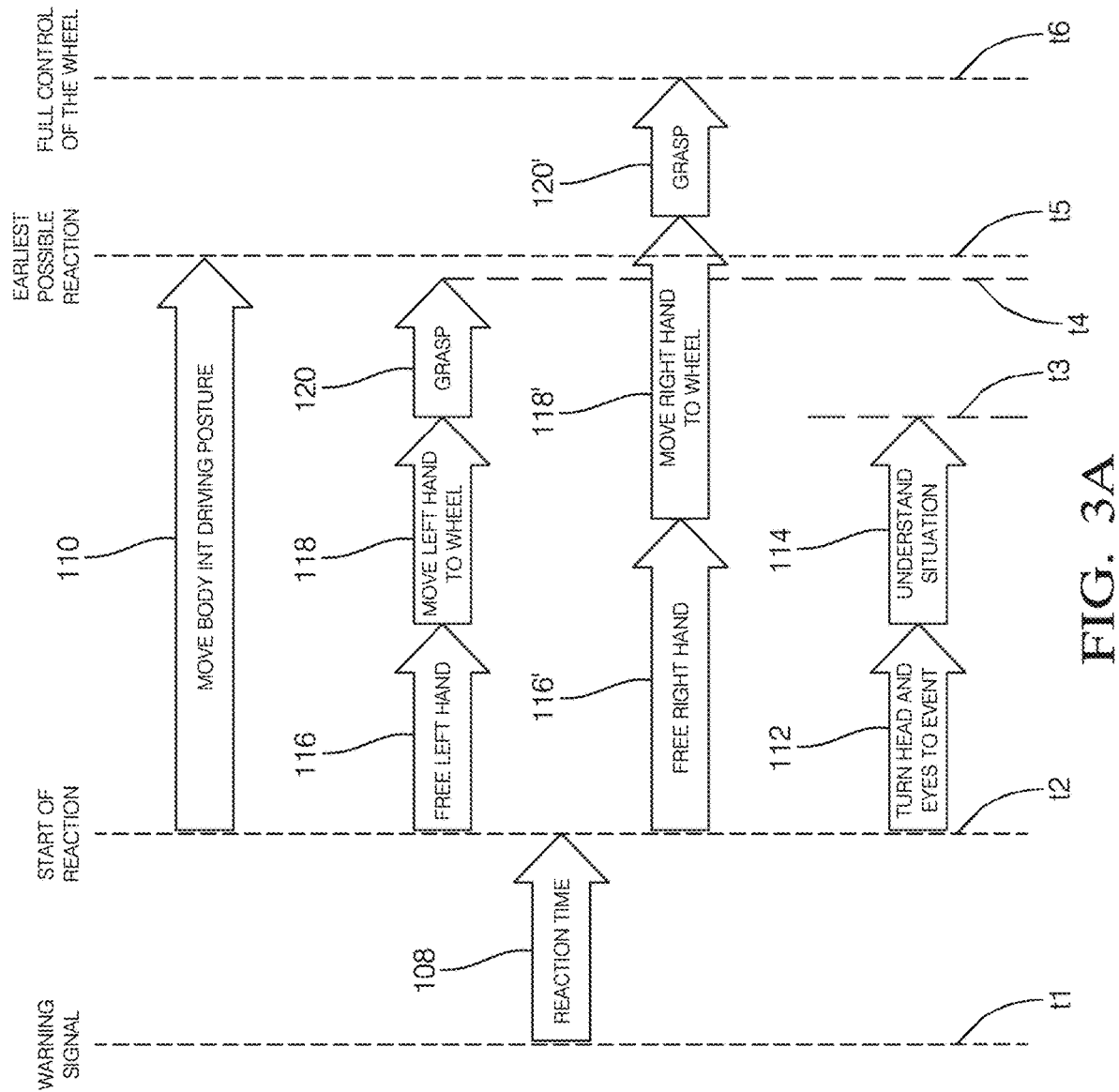
Figure 3B:
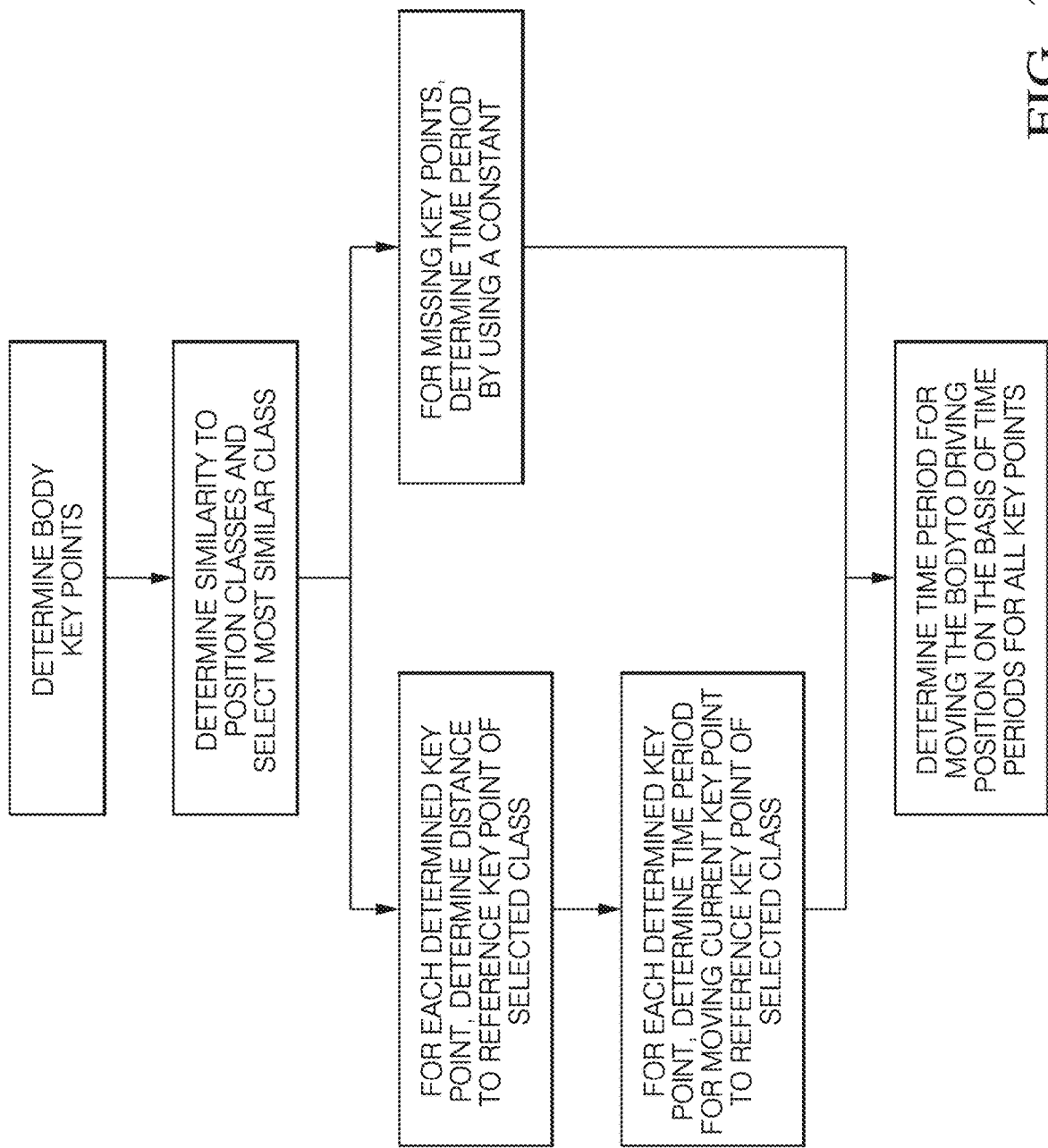
Figure 4:
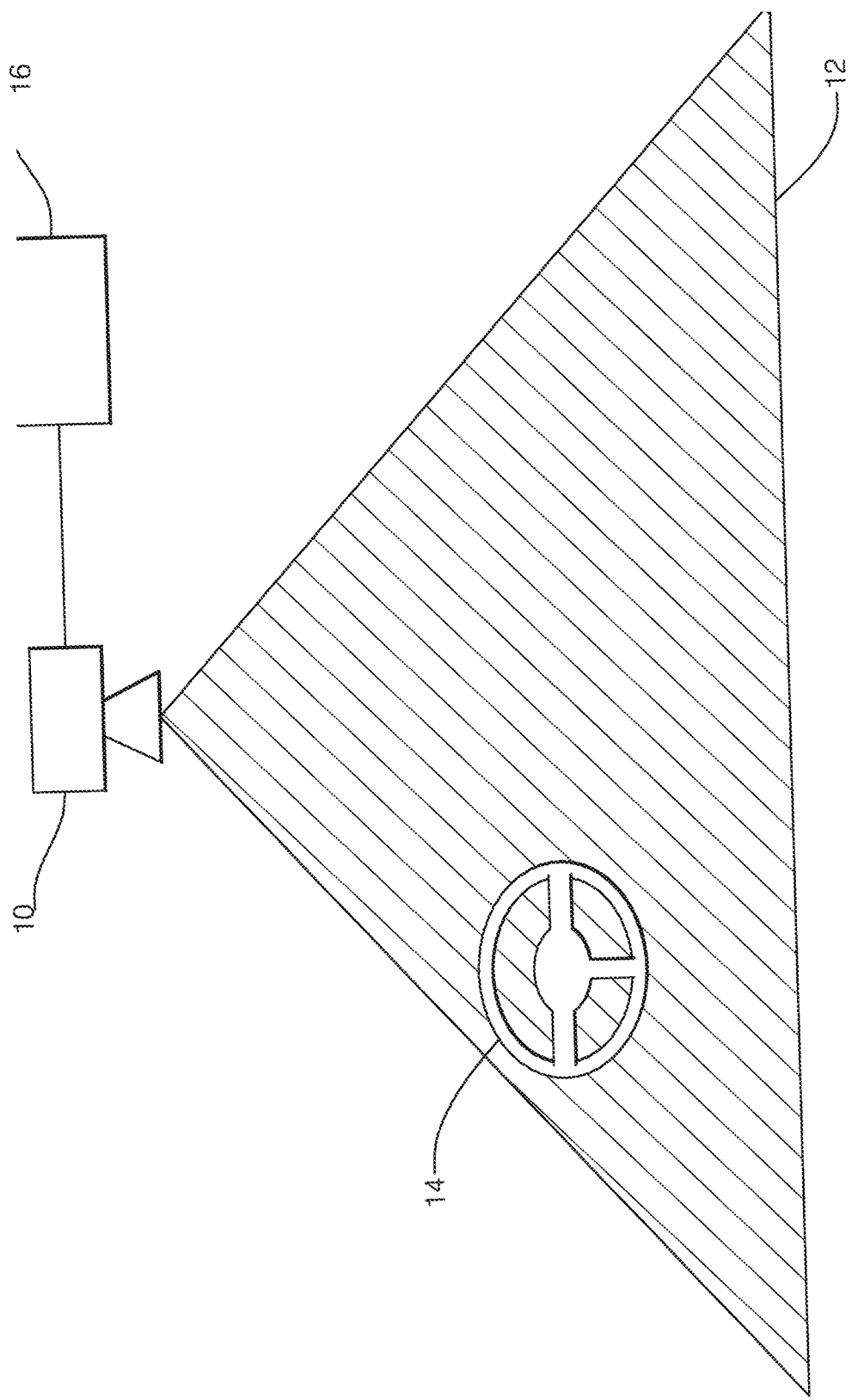
Figure 5A:
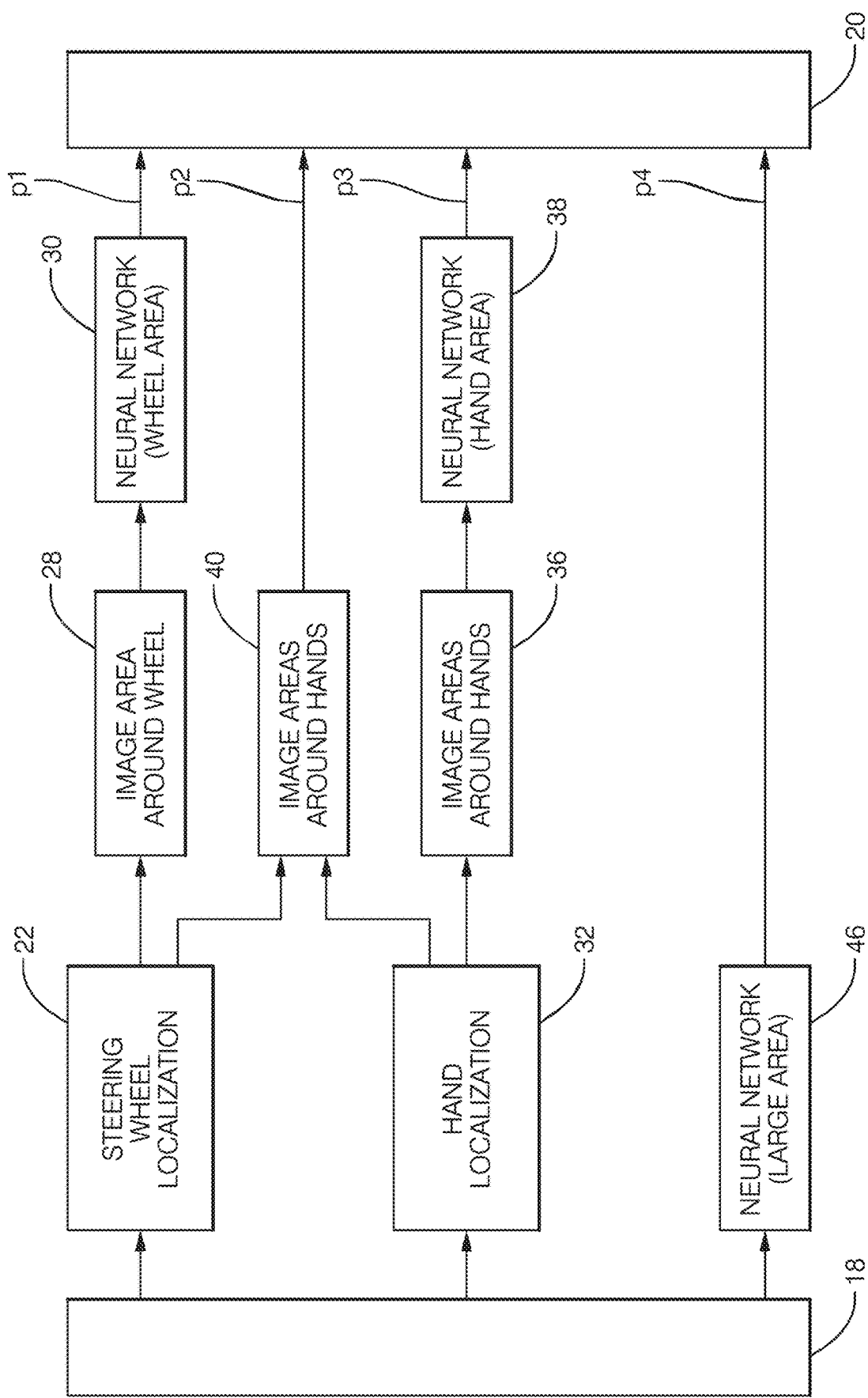
Figure 5B:
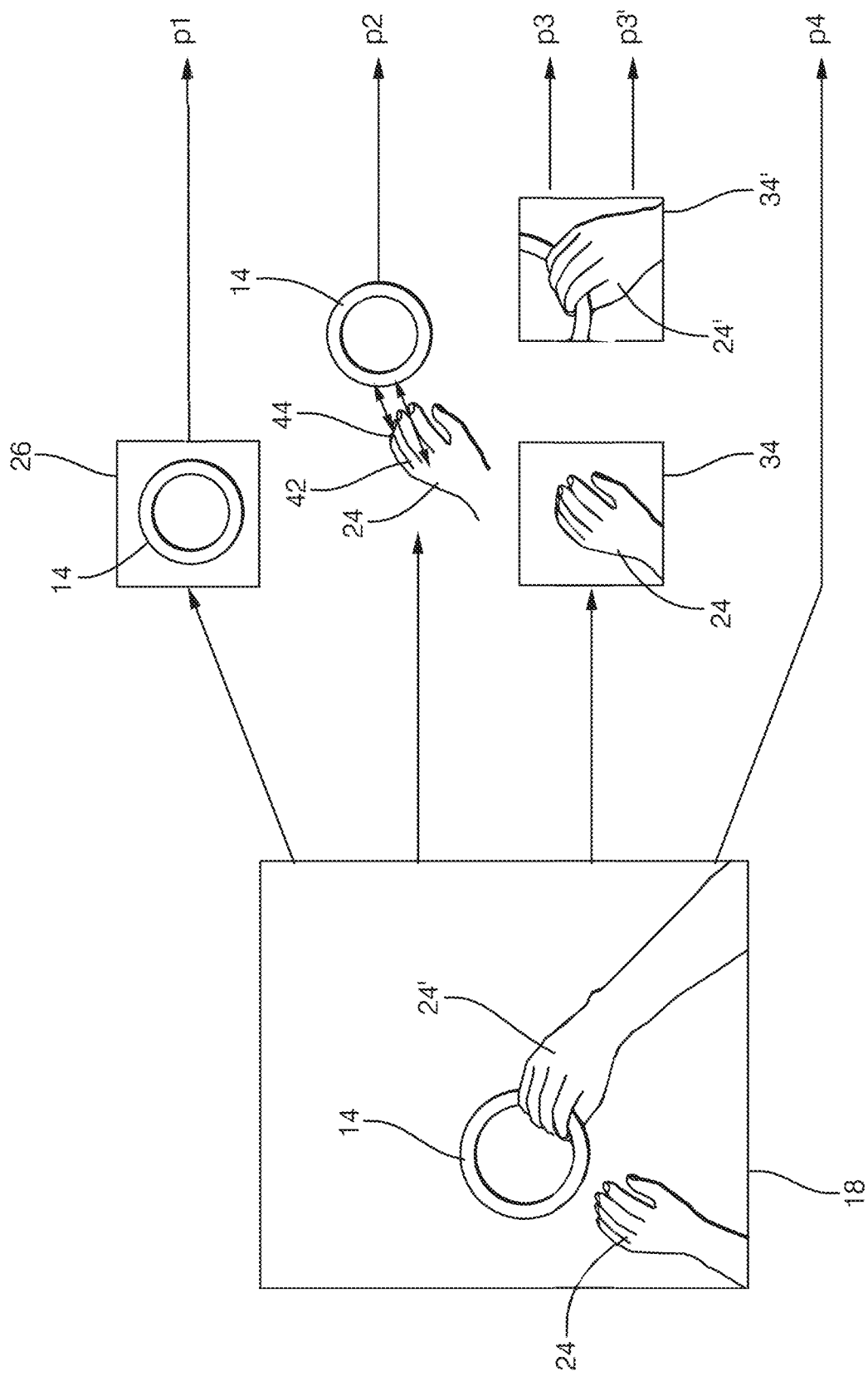
Figure 6:
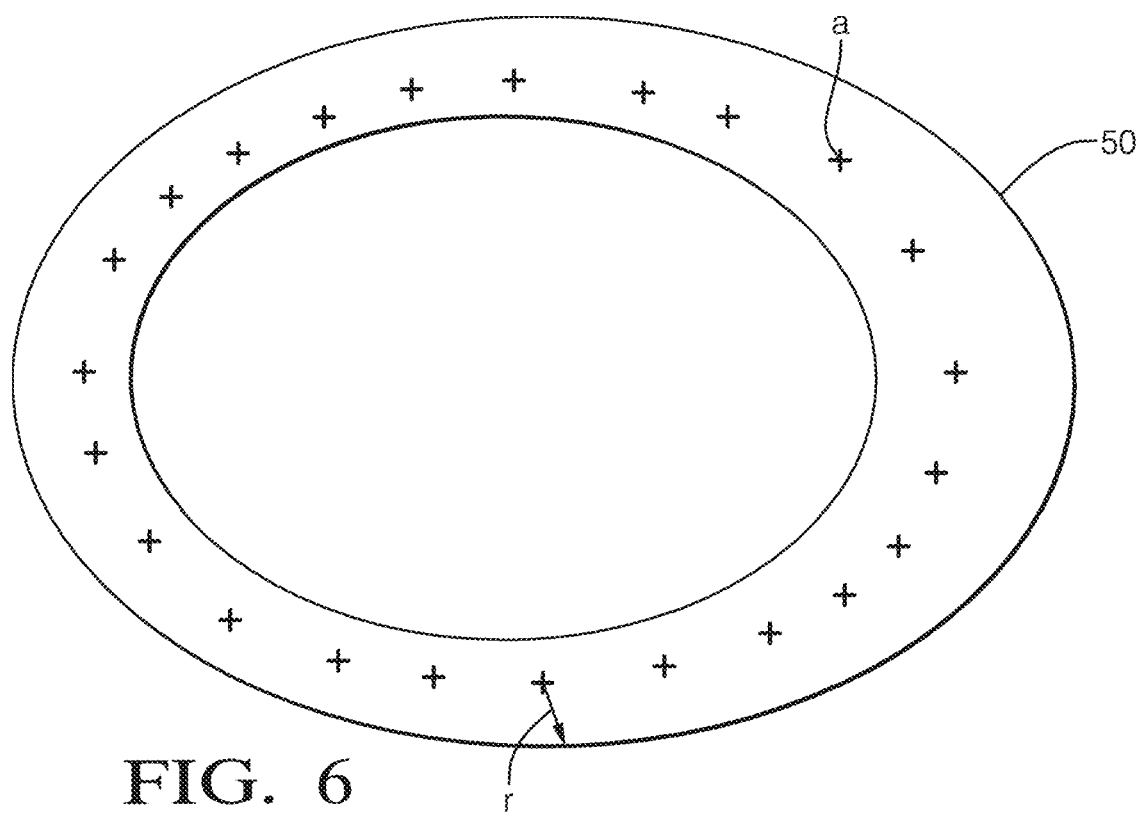
Figure 7:
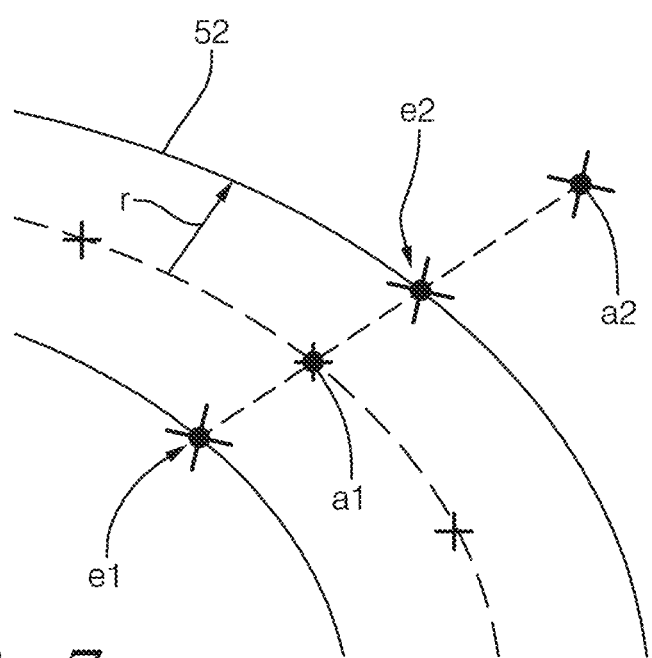

Exemplary embodiments and functions of the present disclosure will be described in more detail in the following with reference to the drawings showing in:

FIG. 1 a schematic illustration of a method for determining an estimate of the capability of a vehicle driver to take over control of a vehicle;

FIG. 2 a schematic illustration of a system for determining an estimate of the capability of a vehicle driver to take over control of a vehicle;

FIG. 3a a schematic illustration for an example procedure of taking over control of a vehicle;

FIG. 3b a schematic illustration of a method for determining the time required to move the body of a driver to a reference position;

FIG. 4 a schematic illustration of a system for determining an information on whether a hand of a vehicle driver cooperates with a steering element of a vehicle;

FIG. 5a a schematic overview of a method for determining an information on whether a hand of a vehicle driver cooperates with a steering element of a vehicle;

FIG. 5b a schematic illustration of aspects of FIG. 5a;

FIG. 6 a schematic illustration of a model representing a steering element in an image; and FIG. 7 a schematic illustration of a portion of the model of FIG. 6.

DETAILED DESCRIPTION

Automatic driving functions provided by, e.g., Advanced Driver Assistance Systems (ADAS) is an active field of development in the automotive sector. In particular, semi-autonomous or even full autonomous driving applications are subject to large-scale engineering efforts, wherein safety requirements are paramount because the driver hands over partial or full control to the vehicle, e.g., to a an ADAS. One issue is that many automatic driving algorithms cannot always ensure perfect functionality under all conditions. This means that in a real traffic environment some rare scenarios must be expected which cannot be dealt with in a satisfactory and reliable manner by automatic means. In such scenarios, it may be desirable or even required that the human driver takes over control of the vehicle. The driver can then correct an automatic driving behavior or can fully control the vehicle instead of automatic driving means.

It has been found that the driver does not always take over control of the vehicle in a desired manner. That is, although a warning signal can give a clear indication to the driver to take over control as soon as possible, the driver may not always react instantly. Different circumstances may influence the driver's behavior in view of the capability to take over control, thus causing uncertainty. However, uncertainty is in conflict with predefined safety requirements in the context of ADAS. It is to be expected that safety requirements will be increasing in the future with higher levels of driving automation. Accordingly, this document describes techniques and systems that provide an estimate of the capability of a vehicle driver to take over control of a vehicle. In the figures, the same or corresponding parts are indicated with the same reference signs.

FIG. 1 illustrates a method for determining an estimate of the capability of a vehicle driver to take over control of the vehicle. The vehicle is not shown in the figures but can be for example any passenger vehicle, in particular a usual passenger car available on the market. The method comprises a step 100 in which one or more estimation parameters are determined, as indicated by reference numeral 102 in FIG. 1. Each of the estimation parameters 102 represents an influencing factor for the capability of the vehicle driver to take over control of the vehicle. In step 104, an estimate 106 of the capability of the vehicle driver to take over control of the vehicle is determined on the basis of the estimation parameters 102.

In FIG. 2, a system for carrying out the method of FIG. 1 is illustrated. The system comprises a data processing unit 16, which is connected to sensors 11, 11'. The sensors 11, 11' can be configured as cameras for capturing image data of a portion of the passenger cabin of the vehicle. In FIG. 2, it is schematically shown that the sensors 11, 11' are mounted at different positions. The sensor 11 has an orientation towards the driver seat 15, wherein a vehicle driver 13 is sitting on the driver seat 15. Thus, the sensor 11 captures an upper part of the body of the driver 13. In the vehicle, the sensor 11 can be for example mounted inside the passenger cabin at the roof portion of the passenger cabin. Particularly, the sensor 11 may be integrated into a roof unit comprising a rear view mirror of the vehicle (not shown). In contrast to the sensor 11, the sensor 11' has an orientation towards the steering wheel 14 of the vehicle, which is indicated as a circle in FIG. 2. For example, the sensor 11' can be mounted on a steering wheel column on which the steering wheel 14 is mounted (not shown). Due to the mounting position of the sensor 11' the corresponding image data provided by the sensor 11' captures the steering wheel 14 and also a region around the steering wheel 14. This allows detecting hands of the driver 13 when they are not grasping the steering wheel 14. The hands are indicated schematically by reference numeral 17 in FIG. 2. A time required for the hands 17 to move to the steering wheel 14 can be determined on the basis of the minimum distance d between the hands 17 and the steering wheel 14, which can be defined in more detail as the minimum distance to an outer ring of the steering wheel 14.

The data provided by the sensors 11, 11' is used to determine a plurality of estimation parameters on which basis an estimate of the driver's capability to take over control of the vehicle is determined. This will be explained further with regard to FIG. 3a, which shows a time diagram comprising several actions of the driver 13 when taking over control of a vehicle. The time dimension is indicated by arrow 107.

At time instance t1, a warning signal is activated and presented to the driver 13, thereby informing the driver 13 that he needs to take over control of the vehicle as soon as possible. The warning signal may be an acoustic signal. It is assumed that the driver 13 is not in control of the vehicle at time instance t1. However, it can happen that the driver 13 is already in control of the vehicle if the warning signal is activated.

A reaction time 108 is required before any portion of the driver's body can show a reaction. Accordingly, a reaction can be assumed to start at a second time instance t2 after the reaction time 108. After the start of reaction at the second time instance t2 several portions of the driver's body are moving simultaneously, wherein the time instance of earliest possible reaction of the driver 13 (i.e. partial control of the steering wheel 14) can be identified at a fifth time instance t5 and a time instance of full control of the steering wheel 14 can be identified at a sixth time instance t6. Control of the steering wheel 14 allows the driver 13 to control the vehicle. The time periods between the first time instance t1 and the fifth and sixth time instance t6 form an estimate of the driver's capability take over control of the vehicle. It is also possible that one of the time periods, i.e. t5–t1 or t6–t1, form an estimate of the capability of the driver 13 to take over control. This shall not be construed as limiting other possibilities of expressing the capability.

A plurality of time periods is estimated for moving several portions of the body of the driver 13 to predefined positions, which can be denoted as reference or driving positions. As one estimation parameter a first time period 110 for moving an upper portion of the driver's body to a predefined driving position on the vehicle seat 15 is determined on the basis of the image data provided by the sensors 11, 11', in particular solely on the basis of image data of the sensor 11. As another estimation parameter the time period t3–t2 required by the driver 13 to bring his head to an orientation towards a relevant traffic event in the surrounding of the vehicle (112) and to understand the situation (114) is determined. The traffic event can be detected by other sensors of the vehicle (not shown) and the time period 114 can be a constant derived from theoretical or empirical data about human cognitive processing capabilities. This also holds for the reaction time 108.

As yet another estimation parameter the time required until the left hand of the driver 13 grasps the steering wheel 14 is determined, which corresponds to the time period between the fourth time instance t4 and the second time instance t2, i.e. t4–t2. This time period can be divided into three time periods 116, 118, and 120. The time period 116 corresponds to the time required for freeing the left hand from an object with which the hand interacts at the first-time instance t1 and the second time instance t2. The time period 118 corresponds to the time required to move the left hand to the steering wheel 14. The time period 120 corresponds to the time required for the left hand to grasp the steering wheel 14, thereby taking control of the steering wheel 14 by means of the left hand.

It is understood that the estimation parameters can at least partially be determined on the basis of image data of the sensors 11, 11', wherein for example the distances of the respective parts of the body relative to their desired positions and/or states is determined from the image data by known techniques of image processing. As one example, machine-learning models may be trained and then used for detecting the body parts and extracting the desired information on this basis, which can also be carried out using trained machine-learning models. Other ways of gathering relevant information for determining the estimation parameters will become apparent when considering the disclosure.

Time periods 116', 118', and 120' correspond in general meaning to the time periods 116, 118, and 120, however applicable to the right hand of the driver. The time periods 116', 118', and 120' add up to a time period t6–t2, which is longer than the corresponding time period t4–t2 for the left hand. This difference can be due to the right hand interacting with a special object, for example a piece of food, and also due to the right hand being further away from the steering wheel 14 at the time of activation of the warning signal. These aspects can cause a longer time until the right hand grasps the steering wheel 14, wherein grasping is a type of cooperation with the steering wheel 14. However, other relations between these time periods are possible.

The fifth time instance t5 represents the time instance in which the driver 13 has gained partial control of the vehicle and in thus able to perform a possible steering action. Per definition, the driver 13 has partial control when the body of the driver 13 has reached the predefined driving position (110), the head of the driver has turned to the traffic event and allowed to understand the situation (112, 114), and when at least one hand 17 of the driver grasps the steering wheel 14 (120). This condition is fulfilled at time instance t5.

The sixth time instance t6 represents the condition in which the driver 13 has gained full control of the vehicle, which may be regarded as a condition in which the driver has full control over the steering wheel 14 and can perform any necessary steering action. Per definition, the driver 13 has full control when the body of the driver 13 has reached the predefined driving position, the head of the driver has turned to the traffic event and allowed to understand the situation (112, 114), and when both hands 17 of the driver 13 grasp the steering wheel 14. This condition is fulfilled at time instance t6.

It is understood that the processing unit 16 is configured to determine the time instances t5 and/or t6 relative to the time instance t1, e.g., in the form of differences or time periods t5–t1, t6–t1, t6–t5, thereby providing the estimate of the driver's capability to take over control of the vehicle. Other intermediate time instances and time periods, for example time periods 116 and 118 can also be determined or predicted by the processing unit 16. Predefined models can be used, wherein for example the time periods 116, 118, and 120 are determined on the basis of the object type in the left hand and the distance of the left hand to the steering wheel 14.

The processing unit 16 has a communication interface for providing the estimate to other processing systems of the vehicle.

The estimate can be determined in a very short amount of time, in particular in real time, so that the estimate is available effectively at the first-time instance t1. The estimate can also be regarded as a prediction when the driver 13 will be in control of the vehicle.

An automated driving function of the vehicle can be modified, in particular activated or deactivated on the basis of the estimate. In this way, the ability of the driver 13 to perform control actions is taken into account and safe operation of the vehicle is ensured.

FIG. 3b provides an overview of a method for determining the time required for a driver to move the body to a predefined driving position, which may be used for determining the time period 110 from FIG. 3a. As a first step, 3D-body key points of the driver are determined on the basis of 3D-image data of the driver, as generally described with respect to various embodiments. These key points represent the current body position of the driver. Afterwards, the current driver position is compared to a plurality of position classes, each position class representing a reference driver position by means of reference body key points, wherein the similarity of the current driver position is determined relative to the position classes. This can be done by determining the average distances between the current body key points and the reference key points of the classes, wherein the minimum average distance identifies the most similar class. The most similar class is selected and the distances between the current key points and the reference key points of the selected class are determined. For each distance, a time period is determined, which is expected to be required for moving the current key point to the respective reference key point, i.e. by moving the underlying body. This is the time required until the current key point and the respective reference key point are expected to match with each other. On the basis of the time periods for all key points, the overall time required to bring the body to the predefined driving position is determined, e.g., by taking the maximum of these time periods. If the selected position class has a reference key point, which was not determined for the current driver position (missing key point, for example due to obstructed view of the sensor) then a constant is used as the time period for moving the corresponding body portion to the respective reference position.

FIG. 4 illustrates aspects of a system for carrying out a method for determining information on whether a hand of a vehicle driver cooperates with a steering element of a vehicle. A sensor 10 is mounted on a vehicle (not shown) such that a field of view 12 of the sensor 10 captures a steering wheel 14 of the vehicle. The sensor can be mounted inside a passenger cabin of the vehicle (not shown), for example at the inside of a roof of the cabin. The sensor 10 can be a camera for taking images of the field of view 12. Therefore, each of the images taken by said sensor 10 includes the steering wheel 14. Preferably, the sensor 10 is arranged such that the steering wheel 14 is always contained in the images taken by the sensor 10. Therefore, adjustments of a steering wheel column do not lead a displacement of the steering wheel beyond the field of view 12.

The sensor 12 is connected to a processing unit 16, which is configured to carry out a computer implemented method for determining an information on whether at least one hand of a vehicle driver (not shown) is cooperating with the steering wheel 14. This will be described in greater detail in the following.

FIG. 5a shows a schematic overview of a method for determining an information on whether a hand of a vehicle driver cooperates with a steering element of a vehicle. The method begins with taking an image 18 by means of the sensor 10. The image 18 is then processed by means of the processing unit 16 in order to arrive at a plurality of likelihood values p1, p2, p3, and p4, each of the likelihood values representing a probability that at least one hand of the vehicle driver cooperates with the steering wheel 14. The likelihood values p1, p2, p3, and p4 are then subject to a fusion step 20, which will be addressed further below.

In one aspect of the method the steering wheel 14 is detected within the image 18 in step 22. In FIG. 5b the image 18 is schematically shown with two hands 24, 24' of the vehicle driver, wherein one of the hands 24 is positioned in close proximity to the steering wheel 14 and the other one of the hands 24' is grabbing the steering wheel 14. On the basis of the detected steering wheel 14 an image portion 26 is then determined in step 28 by cropping the image 18 to the steering wheel 14 including a margin around the steering wheel 14, cf. FIGS. 2a and 2b. The steering wheel portion 26 is then processed further by a neural network in step 30 in order to obtain the likelihood value p1.

In another aspect of the method one or more hands 24, 24' of the vehicle driver are detected in step 32. Hand portions 34, 34' are then determined in step 36 by cropping the image 18 to the hands 24, 24'. Each of hand portions 34, 34' is then processed by means of another neural network step 38. The output is a likelihood value p3, p3' for each of the image portions 34, 34'.

In another aspect of method at least one distance measure is determined in step 40. In one example a plurality of 3D-positions is determined for each of the detected hands 24, 24', wherein the 3D positions can be for example a center position 42 and a fingertip position 44 as illustrated in FIG. 2B. For each of the positions 42, 44 the distance to the steering wheel 14 is evaluated. The minimum distance between the positions 42, 44 steering wheel 14 is then mapped to the likelihood value p2.

Another aspect of the method is that the complete image 18 is processed by means of another neural network in step 46 in order to obtain the likelihood value p4.

Further details of the method steps are described in the following.

In view of step 22, the steering wheel 14 can be localized within the image 18 by using a particle filter approach. In particular, the 3D position and orientation of the steering wheel 14 can be determined based on amplitude and depth data of the image 18, wherein the sensor 10 can be a time-of-flight camera mounted inside the vehicle. This is to say that the image 18 comprises three-dimensional image data. Alternatively, 2D-image data can be used.

As an initial step for localizing the steering wheel 14 a fixed number of samples for the position and orientation of the steering wheel 14 are drawn uniformly (or according to normal distributions centered at the last known position(s) of the steering wheel 14 or at the center of the range of possible positions of the steering wheel 14) at random within a predefined search space. In a first iteration, a rating function is calculated for each of the samples, wherein the rating function quantifies the accordance, i.e. match of the sample with the depth values of the image 18. This can be done by generating sample points for a model, namely an elliptical torus model 50 of the steering wheel 14 (cf. FIG. 6), the torus model 50 being positioned according to the sample. Corresponding sample pixels of the image are then identified, and the rating function is computed on the basis of the pixel values of the sample pixels. More details of this step will be addressed further below.

For the next iteration, new samples are drawn from the samples of the first iteration with a probability that is proportional to the values of the rating function of the samples from the first iteration. Each or at least some of the new samples is slightly modified by adding small random values to its position and orientation. These random values are chosen from a Gaussian distribution with a standard deviation that is individually set for each dimension of the position and orientation in proportion to the size of the search space in that dimension. It is preferably enforced that the new samples stay within the search space.

For each of the redrawn samples of the next iteration the rating function is calculated again based on the depth values of the image 18. This process is repeated iteratively in the same manner, and with each iteration the standard deviations of the added random values are slightly reduced until they are at a tenth of their start value (simulated annealing). This effectively causes the samples to concentrate around those positions and orientations where the torus model 50 appears to fit well to the image 18. To increase the focus on the best result, one percent of the new samples is not drawn at random but created from the best result of the last iteration. Here, the random values that are added only have a hundredth of the usual standard deviation. Additionally (or alternatively), samples can be set to fixed values that cover the complete search space in regular intervals or uniformly at random.

The steering wheel position can usually be modified by the driver. Therefore, there is a range of possible positions and orientations of the steering wheel 14 relative to the sensor 10. Knowledge about this range can be taken into account to constrain the search space further.

Details of the torus model 50 and the rating function are further described in the following.

The depth values of the image 18 (the depth values form a depth image) are clamped to a predetermined range and then filtered over time to reduce noise. The filtering can be carried out on the basis of a sequence of images taken at subsequent time instances. A Sobel-edge filter is applied to the filtered image. The resulting edge image is clamped to reduce the effect of outliers and to avoid overrating of very steep edges compared to moderate ones. The rating function for the sampled steering wheel positions and orientations is calculated using the depth image, the edge image, and a model of the steering wheel 14.

As also indicated further above the model is preferably an elliptical torus 50, FIG. 6, i.e. a surface consisting of all the points that have a certain distance r to an ellipse in 3D space. The length of the major and minor axis of the ellipse and the radius r are fixed and set to values that approximate the shape of the outer ring of the actual steering wheel 14 (which is known a priori). It is understood that the torus 50 is a three-dimensional geometrical model positioned in a three-dimensional space although FIG. 6 shows the torus 50 only in two dimensions.

For a given sample (position and orientation) of the model 50 a plurality of points (i.e. sample points) are determined for the purpose of evaluating the rating function for the respective sample. Each of the points is associated with a depth value. Due to the position and orientation of the model 50 the model 50 has a shape that depends on the perspective of the sensor 10. An example of such a shape is illustrated by the torus 50 of FIG. 6.

A fixed number of points a is sampled from the 3D ellipse spanning the torus 50 (cf. FIG. 6). For each or at least some of these points a, the local direction of the ellipse is approximated by subtracting its direct neighbors. For a given sample point a1 of the points a, cf. FIG. 7 showing a portion of the torus 50 of FIG. 6, two points e1 and e2 are determined that lie on the edge 52 of the torus 50 as seen from the point of view of the sensor 10. The direction from a1 to the edge 52 is given by the cross product of the local direction of the ellipsis with the direction from the sensor 10 position to a1. By moving along that direction, starting at a1, over a distance of the torus radius r into both directions, the two edge points e1 and e2 are obtained. Following that direction further than r into the direction that leads away from the center of the ellipse, a point a2 outside the torus is calculated.

For a given sample position and orientation for the torus 50 the 3D positions of the said sample points a, are calculated, and with them their respective edge points e1, e2 and points a2 outside the torus 50, as shown in an exemplary manner in FIG. 7 for the point a1. All or at least some of the points are then projected from 3D coordinates to pixel coordinates of the depth image using a predetermined transformation rule. The transformation rule can be based on intrinsic parameters of the sensor 10, i.e. prior knowledge about the spatial relationship between 3D points in the field of view of the sensor 10 and the resulting pixel information of the image 18 can be available.

Using the depth image, for each point on the model 50 (i.e. points a, a1) and its corresponding points outside the model 50 (a2), their depth values are subtracted, i.e. a2−a1. The resulting depth differences can be clamped to a predefined range of values, e.g., a range between zero and a fixed value, in order to prevent an overly strong influence of implausible depth differences. This is because it can be assumed that the steering wheel 14 is closer to the sensor 10 than the background around the steering wheel 14 except possibly the hands 24 24' and arms of the driver.

The rating function can have two components, (i) the sum of the depth differences for all sample points (i.e. a2−a1 for all a) and (ii) the sum of the edge values of the edge image for all sample positions (i.e. e1+e2 for all a). Both components can then be added with weights. The result can be normalized and subjected to the exponential function so as to obtain the final result of the rating function for the respective sample location (i.e., the sample position and orientation of the model 50).

For at least some of the possible sample locations of the model 50 the rating function is computed as set forth above. The different results of the rating function are then compared in order to localize the steering wheel 14. For example, the maximum of the different results can be chosen and the respective position and orientation of the model 50 is the location of the steering wheel 14. Alternatively, a weighted or unweighted average of the different results or a subset of thereof with a high rating (above a threshold) can be determined and used to determine the position and orientation of the model 50 matching with the steering wheel 14. It is understood that the rating function can also be formulated in a way that the minimum of the different results of the rating function indicates the location of the steering wheel 14.

The individual likelihood values p1, p2, p3, and p4 can be fused in step 20 by applying a fusion rule. The fusion rule can be configured to output a fused likelihood value p on the basis of the individual likelihood values p1, p2, p3, p4, wherein the fused likelihood value is an information on whether one or both of the hands 24, 24' cooperate with the steering wheel 14. The fusion rule can comprise a formula that can be expressed as: p=Πpi/(Πpi+Π(1−pi)), wherein pi are the individual likelihood values for i={1, 2, 3, 4} and Π denotes the product over all i.

It is understood that the individual likelihood values p1, p2, p3, p4, as well as the fused likelihood value can be used as estimation parameters for determining the estimate on the driver's capability to take over control of the vehicle. It is further understood that other estimation parameters, in particular distances between the hands and the steering wheel can be determined as described in connection with the determination of the likelihood values. It is also possible to directly determine the expected time periods for bringing the hands or other portions of the driver's body into their desired states, e.g., reference states or reference positions. These time periods can be used as estimation parameters for determining the estimate of the driver capability to take over control of the vehicle.

What is claimed is:

1. A method for determining an estimate of capability of a vehicle driver to take over control of a vehicle, the method comprising:
   determining a similarity between a current position of the vehicle driver and a plurality of position classes for positions of the vehicle driver in which taking over control of the vehicle is expected to be feasible or facilitated for the driver;
   selecting one of the plurality of position classes having maximum similarity to the current position;
   determining at least one estimation parameter as at least one distance between the selected one of the plurality of position classes and the current position of the vehicle driver, the at least one estimation parameter representing an influencing factor for the capability of the vehicle driver to take over control of the vehicle; and
   determining an estimate based on the at least one estimation parameter by means of a predefined estimation rule, the estimate representing the capability of the vehicle driver to take over control of the vehicle.

2. The method of claim 1, wherein:
the estimate comprises a time period in which the driver is expected to take over control of the vehicle in response to a warning signal; and
the estimate comprises information on whether within a predefined time period the driver is capable to take over control of the vehicle in response to the warning signal.

3. The method of claim 1, wherein:
the estimate represents the capability of the driver to take over at least partial control of the vehicle;
the driver is expected to have at least partial control of the vehicle if at least one hand of the driver cooperates with a manual steering element of the vehicle or at least one portion of a body of the driver matches a predefined driving position;
the estimate represents the capability of the driver to take over full control of the vehicle; and
the driver is expected to have full control of the vehicle if both hands of the driver cooperate with a manual steering element of the vehicle or if the body of the driver or the at least one portion of the body matches the predefined driving position.

4. The method of claim 3, wherein:
the estimate comprises a minimum time period in which the driver is expected to take over partial control of the vehicle in response to a warning signal; and
the estimate comprises a maximum time period in which the driver is expected to take over full control of the vehicle in response to a warning signal.

5. The method of claim 1, wherein:
the at least one estimation parameter represents position or distance information on at least one portion of a body of the driver; and
the at least one estimation parameter includes position or distance information on one or more of:
one or more hands of the driver;
a head of the driver;
an upper part of the body of the driver;
one or more hips or an abdomen area of the driver;
one or more eyes of the driver; and
one or more eyelids of the driver.

6. The method of claim 1, wherein:
the at least one estimation parameter is determined with respect to a reference object or a reference position,
the at least one estimation parameter is determined as a time period in which the driver is expected to reach the reference object or reference position in response to a warning signal so as to satisfy at least one target condition,
the driver is expected to be in control of the vehicle if the at least one target condition is satisfied or wherein taking over control of the vehicle is expected to be feasible or facilitated for the driver if the at least one target condition is satisfied.

7. The method of claim 1, wherein:
the at least one estimation parameter represents interaction or object information on at least one portion of a body of the driver;
the at least one estimation parameter includes one or more of:
information on whether one or more hands of the driver cooperate with a manual steering element of the vehicle;
information on whether one or more hands of the driver cooperate with an object other than the steering element;
information on whether an object is placed on a lap of the driver; and
information on whether an object is present on an ear of the driver.

8. The method of claim 1, wherein:
the at least one estimation parameter represents distraction information of the driver; and
the at least one estimation parameter includes information of one or more of:
activity of the driver for example operation of a mobile or stationary device;
additional passengers in the vehicle for example number or position of additional passengers within the vehicle;
operation of electronic media inside the vehicle;
telephone conversation inside the vehicle; and
conversation noise inside the vehicle.

9. The method of claim 1, wherein:
the at least one estimation parameter represents information on an operational state or environment of the vehicle; and
the at least one estimation parameter includes information on one or more of:
vehicle speed;
a property of air inside or outside the vehicle including one or more of pressure, temperature, and humidity;
opening state of one or more windows of the vehicle;
operation of one or more wipers of the vehicle;
configuration of a driver seat of the vehicle;
quantity or position of objects around the vehicle;
quantity or size of traffic signs detected by the vehicle;
traffic environment of the vehicle; and
street condition.

10. The method of claim 1, wherein:
the at least one estimation parameter represents fitness or personal information on the driver; and
the at least one parameter includes information on one or more of:
drowsiness of the driver;
mood of the driver;
properties of a body of the driver; and
predefined reaction-capability values.

11. The method of claim 1, wherein determining the at least one parameter comprises:
taking at least one image by means of at least one image sensor mounted on the vehicle, wherein the at least one image captures an interior portion of the vehicle, at least a steering element of the vehicle, or an area in which at least a portion of the driver is expected to be located while the driver is in control of the vehicle; and
determining, based on the at least one image, the at least one estimation parameter, wherein an automated control function of the vehicle is deactivated if the estimate satisfies a predefined safety condition and wherein otherwise an emergency control function of the vehicle is activated.

12. A system comprising a processing unit configured estimate a capability of a driver of a vehicle to take over control of the vehicle by:
determining a similarity between a current position of the vehicle driver and a plurality of position classes for positions of the vehicle driver in which taking over control of the vehicle is expected to be feasible or facilitated for the driver;
selecting one of the plurality of position classes having maximum similarity to the current position;
determining at least one estimation parameter as at least one distance between the selected one of the plurality of position classes and the current position of the vehicle driver, the at least one estimation parameter representing an influencing factor for the capability of the driver to take over control of the vehicle; and
determining an estimate based on the at least one estimation parameter by means of a predefined estimation rule, the estimate representing the capability of the driver to take over control of the vehicle.

13. The system of claim 12, wherein:
the system comprises at least one sensor configured to take at least one image capturing at least a steering element of a vehicle and/or an area in which at least a portion of the driver is expected to be located while the driver is in control of the vehicle; and
the at least one sensor is configured to provide three-dimensional image data for the at least one image.

14. A non-transitory computer readable medium comprising instructions, which when executed by a processing unit, cause the processing unit to estimate a capability of a driver of a vehicle to take over control of the vehicle by:
determining a similarity between a current position of the vehicle driver and a plurality of position classes for positions of the vehicle driver in which taking over control of the vehicle is expected to be feasible or facilitated for the driver;
selecting one of the plurality of position classes having maximum similarity to the current position;
determining at least one estimation parameter as at least one distance between the selected one of the plurality of position classes and the current position of the vehicle driver, the at least one estimation parameter representing an influencing factor for the capability of the driver to take over control of the vehicle; and
determining an estimate based on the at least one estimation parameter by means of a predefined estimation rule, the estimate representing the capability of the driver to take over control of the vehicle.

15. The non-transitory computer readable medium of claim 14, wherein the instructions, when executed, cause the processing unit to determine the at least one parameter by:
taking at least one image by means of at least one image sensor mounted on the vehicle, wherein the at least one image captures an interior portion of the vehicle, at least a steering element of the vehicle, or an area in which at least a portion of the driver is expected to be located while the driver is in control of the vehicle; and
determining, based on the at least one image, the at least one estimation parameter, wherein an automated control function of the vehicle is deactivated if the estimate satisfies a predefined safety condition and wherein otherwise an emergency control function of the vehicle is activated.

16. The non-transitory computer readable medium of claim 14, wherein:
the estimate comprises a time period in which the driver is expected to take over control of the vehicle in response to a warning signal; and
the estimate comprises information on whether within a predefined time period the driver is capable to take over control of the vehicle in response to the warning signal.

17. The non-transitory computer readable medium of claim 14, wherein:
the estimate represents the capability of the driver to take over at least partial control of the vehicle;
the driver is expected to have at least partial control of the vehicle if at least one hand of the driver cooperates with a manual steering element of the vehicle or at least one portion of a body of the driver matches a predefined driving position;

the estimate represents the capability of the driver to take over full control of the vehicle; and the driver is expected to have full control of the vehicle if both hands of the driver cooperate with a manual steering element of the vehicle or if the body of the driver or the at least one portion of the body of the driver matches the predefined driving position.

18. The non-transitory computer readable medium of claim 14, wherein:

the at least one estimation parameter represents position or distance information on at least one portion of a body of the driver; and the at least one estimation parameter includes position or distance information on one or more of:

one or more hands of the driver;

a head of the driver;

an upper part of the body of the driver;

one or more hips or an abdomen area of the driver;

one or more eyes of the driver; and one or more eyelids of the driver.

19. The non-transitory computer readable medium of claim 14, wherein:

the at least one estimation parameter is determined with respect to a reference object or a reference position, the at least one estimation parameter is determined as a time period in which the driver is expected to reach the reference object or reference position in response to a warning signal so as to satisfy at least one target condition, the driver is expected to be in control of the vehicle if the at least one target condition is satisfied or wherein taking over control of the vehicle is expected to be feasible or facilitated for the driver if the at least one target condition is satisfied.

20. The non-transitory computer readable medium of claim 14, wherein:

the at least one estimation parameter represents interaction or object information on at least one portion of a body of the driver;

the at least one estimation parameter includes one or more of:

information on whether one or more hands of the driver cooperate with a manual steering element of the vehicle;

information on whether one or more hands of the driver cooperate with an object other than the steering element;

information on whether an object is placed on a lap of the driver; and information on whether an object is present on an ear of the driver.

\* \* \* \* \*